US009099751B2

(12) United States Patent
Hays et al.

(10) Patent No.: US 9,099,751 B2
(45) Date of Patent: *Aug. 4, 2015

(54) NANOSTRUCTURED PLATINUM ALLOYS FOR USE AS CATALYST MATERIALS

(71) Applicant: California Institute of Technology, Pasadena, CA (US)

(72) Inventors: Charles C. Hays, Pasadena, CA (US); Sri R. Narayan, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,989

(22) Filed: Nov. 15, 2013

(65) Prior Publication Data

US 2014/0080700 A1      Mar. 20, 2014

Related U.S. Application Data

(63) Continuation of application No. 12/784,466, filed on May 20, 2010, now Pat. No. 8,603,400.

(60) Provisional application No. 61/222,429, filed on Jul. 1, 2009, provisional application No. 61/346,428, filed on May 19, 2010.

(51) Int. Cl.
*B01J 23/00*      (2006.01)
*B01J 23/40*      (2006.01)
*B01J 23/42*      (2006.01)
*B01J 23/44*      (2006.01)
*B01J 23/70*      (2006.01)
*B01J 23/74*      (2006.01)
*C01B 17/84*      (2006.01)

(Continued)

(52) U.S. Cl.
CPC ............... *H01M 4/921* (2013.01); *B01J 23/42* (2013.01); *B01J 23/8913* (2013.01); *B01J 35/0013* (2013.01); *B01J 37/347* (2013.01); *H01M 4/928* (2013.01); *H01M 8/1011* (2013.01); *H01M 2008/1095* (2013.01); *Y02E 60/50* (2013.01)

(58) Field of Classification Search
CPC ........ B01J 23/42; B01J 23/6482; B01J 23/74; B01J 23/8472; B01J 23/8906; B01J 23/8913; B01J 23/892; B01J 23/898; H01M 4/92; H01M 4/921
USPC .......................... 502/326, 337, 338, 339, 350; 429/524–527
See application file for complete search history.

(56) References Cited

U.S. PATENT DOCUMENTS 4,868,073 A * 9/1989 Hashimoto et al. ........... 429/524
7,351,444 B2 * 4/2008 Wang et al. .................... 427/115

(Continued)

OTHER PUBLICATIONS

Biswas et. al., "Large broadband visible to infrared plasmonic absorption from Ag nanoparticles with a fractal structure embedded in a Teflon AF matrix". Applied Physics Letters, vol. 88, p. 013103 (2006).

(Continued)

*Primary Examiner* — Cam N. Nguyen
(74) *Attorney, Agent, or Firm* — Gates & Cooper LLP

(57) ABSTRACT

A series of binary and ternary Pt-alloys, that promote the important reactions for catalysis at an alloy surface; oxygen reduction, hydrogen oxidation, and hydrogen and oxygen evolution. The first two of these reactions are essential when applying the alloy for use in a PEMFC.

25 Claims, 24 Drawing Sheets

Hydrogen-Air fuel cell schematic

(51) Int. Cl.

| | | |
|---|---|---|
| *C01B 17/74* | (2006.01) | |
| *H01M 4/92* | (2006.01) | |
| *B01J 23/89* | (2006.01) | |
| *B01J 35/00* | (2006.01) | |
| *B01J 37/34* | (2006.01) | |
| *H01M 8/10* | (2006.01) | |

(56) References Cited

U.S. PATENT DOCUMENTS

| | | | |
|---|---|---|---|
| 7,435,504 B2* | 10/2008 | He et al. | 429/483 |
| 7,608,560 B2* | 10/2009 | Fan et al. | 502/313 |
| 7,635,533 B2* | 12/2009 | Fan et al. | 429/524 |
| 7,655,137 B2* | 2/2010 | Zhou et al. | 208/134 |
| 7,662,740 B2* | 2/2010 | Chondroudis et al. | 502/180 |
| 7,687,428 B1* | 3/2010 | Zhong et al. | 502/184 |
| 7,691,522 B2* | 4/2010 | He et al. | 429/483 |
| 7,695,849 B2* | 4/2010 | Narayanan et al. | 429/483 |
| 7,695,851 B2* | 4/2010 | He et al. | 429/483 |
| 7,700,521 B2* | 4/2010 | Giaquinta et al. | 502/345 |
| 7,704,628 B2* | 4/2010 | He et al. | 429/483 |
| 7,736,790 B2* | 6/2010 | He et al. | 429/524 |
| 7,740,975 B2* | 6/2010 | He et al. | 429/524 |
| 7,754,370 B2* | 7/2010 | Mei et al. | 429/524 |
| 7,790,647 B2* | 9/2010 | Okumura et al. | 502/103 |
| 7,811,965 B2* | 10/2010 | Cendak et al. | 502/326 |
| 7,858,265 B2* | 12/2010 | Kwak et al. | 429/529 |
| 7,871,738 B2* | 1/2011 | Stamenkovic et al. | 429/524 |
| 7,901,835 B2* | 3/2011 | Hayden et al. | 429/524 |
| 8,021,798 B2* | 9/2011 | Devenney et al. | 429/527 |
| 8,053,135 B2* | 11/2011 | Chang et al. | 429/485 |
| 8,062,552 B2* | 11/2011 | Adzic et al. | 252/500 |
| 8,211,593 B2* | 7/2012 | Gu et al. | 429/524 |
| 8,227,117 B2* | 7/2012 | Hampden-Smith et al. | 429/400 |
| 2005/0053826 A1* | 3/2005 | Wang et al. | 429/44 |
| 2007/0037696 A1* | 2/2007 | Gorer et al. | 502/177 |
| 2009/0023051 A1* | 1/2009 | He et al. | 429/44 |
| 2009/0069172 A1* | 3/2009 | Farag et al. | 502/101 |
| 2009/0247400 A1* | 10/2009 | Stamenkovic et al. | 502/185 |

OTHER PUBLICATIONS

Debe, "Advanced Cathode Catalysts and Supports for PEM Fuel Cells," presentation on catalysts at the 2009 Annual Merit Review Proceedings for the U.S. Department of Energy Hydrogen Program, http://www.hydrogen.energy.gov/pdfs/review09/fc_17_debe.pdf.

Ding et al., "Preparation and characterization of carbon-supported PtTi alloy electrocatalysts". Journal of Power Sources, vol. 175, pp. 794-799 (2008).

Hakim et al., "Nanocoating Individual Silica Nanoparticles by Atomic Layer Deposition in a Fluidized Bed Reactor". Chemical Vapor Deposition, vol. 11, pp. 420-425 (2005).

Haour et al., Figure 1, p. 117 of Rapid Solidification Technology Source Book, American Society for Metals (1983), Metals Park, Ohio, R. L. Ashbrook (Editor).

Hays, Figure 3.8.1. of PhD Thesis, "A Mott-Hubbard/Fermi-Liquid Systems La1-xSrxTiO3," University of Texas at Austin, Austin Texas (1997).

He et al., "Alloy Electrocatalysts Combinatorial Discovery and Nanosynthesis". Journal of the Electrochemical Society, vol. 153, No. 9, pp. A1637-A1643, (2006).

He et al., "Combinatorial screening of PtTiMe ternary alloys for oxygen electroreduction". Physical Chemistry Chemical Physics, vol. 10, pp. 3731-3738, (2008).

Kear et. al., "On the Microstructure of rapidly solidified In-100 Powders," p. 66 of Rapid Solidification Technology Source Book, American Society for Metals (1983), Metals Park, Ohio.

Marienger, Figure 1, p. 121 of Rapid Solidification Technology Source Book, American Society for Metals (1983), Metals Park, Ohio, R. L. Ashbrook (Editor).

Martin et al., "Status of Fuel Cells and the Challenges Facing Fuel Cell Technology Today". Chapter 1, pp. 1-13, ACS Symposium Series, vol. 1040, 2010 American Chemical Society.

Quantum Sphere Corporation, http://www.qsinano.com/technology_catalyst_manufacturing_process.html, website accessed Aug. 14, 2012.

Stalick et al., "The zirconium-platinum phase diagram". Journal of Alloys and Compounds, vol. 430, pp. 123-131, (2007).

Stamenkovic et al., "Trends in electrocatalysis on extended and nanoscale Pt-bimetallic alloy surfaces". Nature Materials, vol. 6, pp. 241-247, (2007).

Whitacre et al., "A high-throughout study of PtNiZr catalysts for application in PEM fuel cells". Electrochimica Acta, vol. 53, pp. 3680-3689, (2008).

* cited by examiner

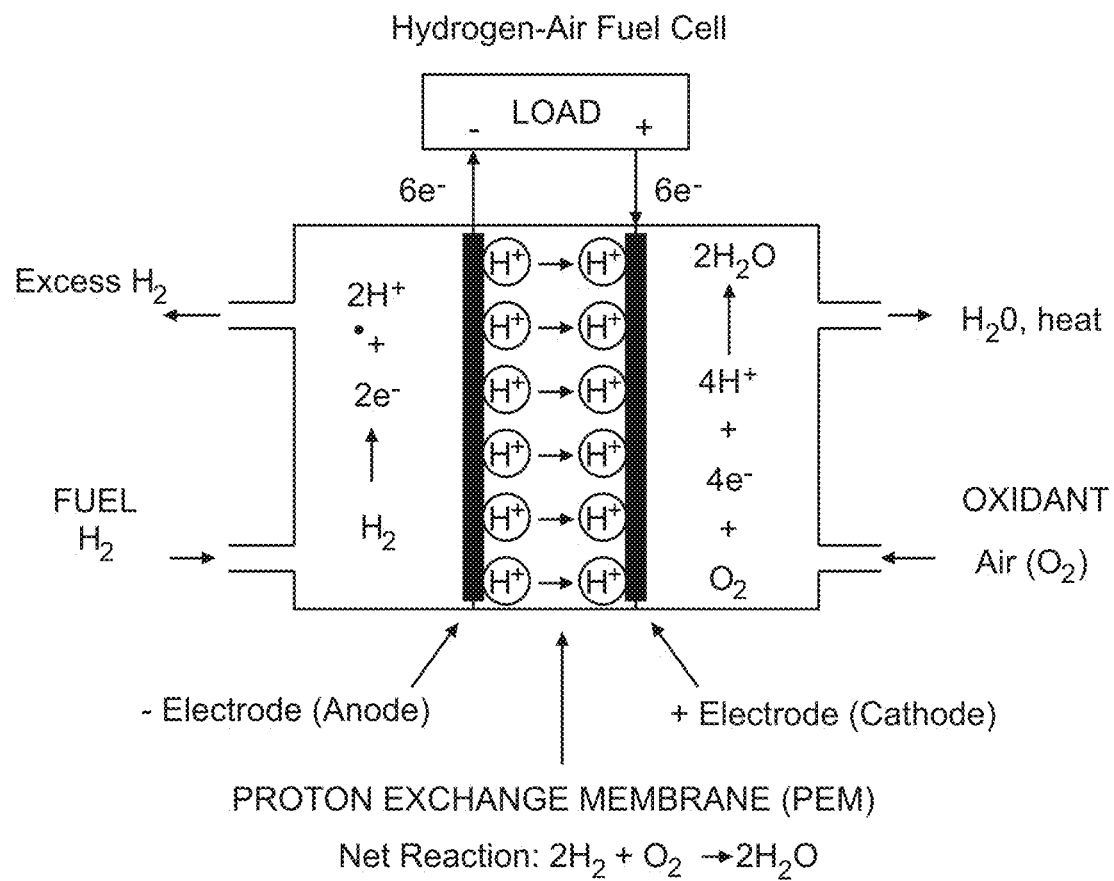
Figure 1: Hydrogen-Air fuel cell schematic

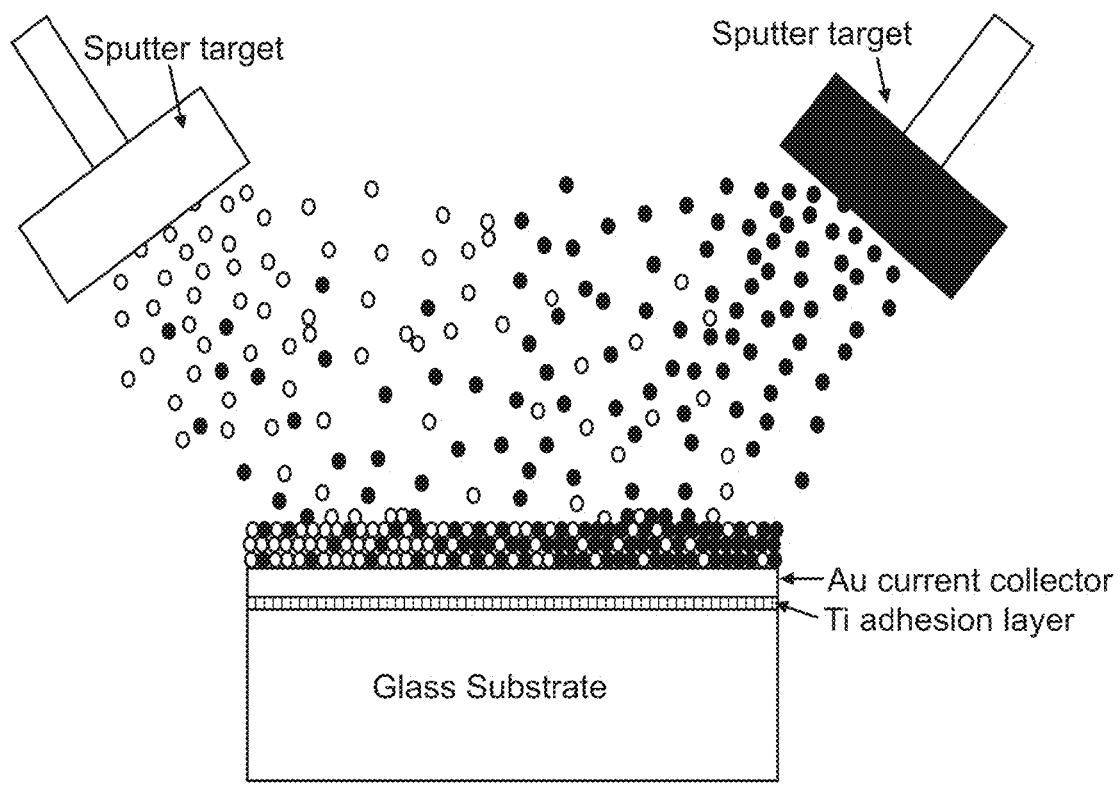
Figure 2a: Co-sputtering

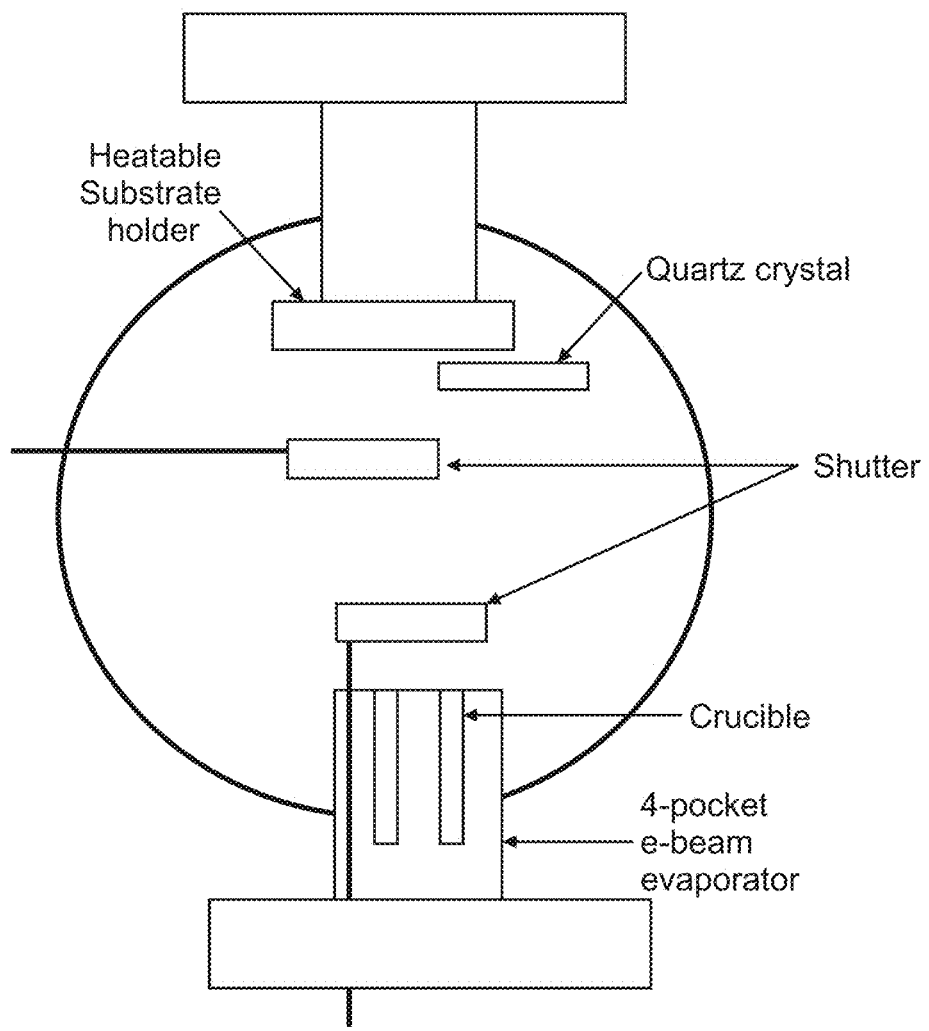
Figure 2b: Electron Beam Evaporation

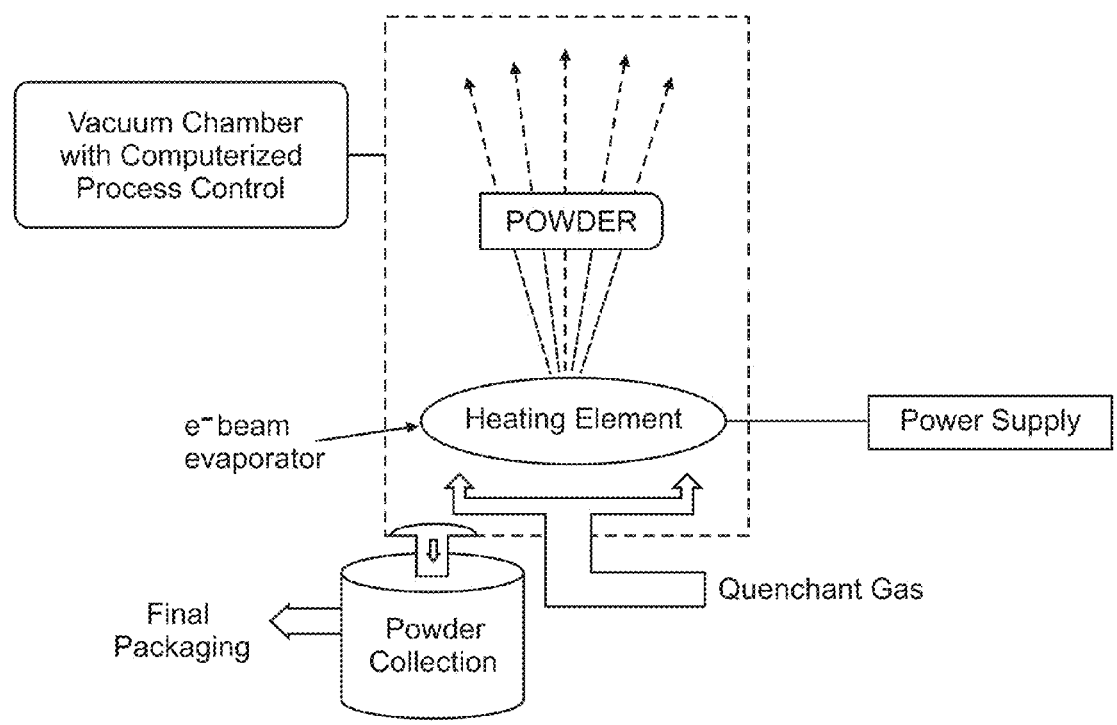
Figure 2c: Vapor-phase condensation

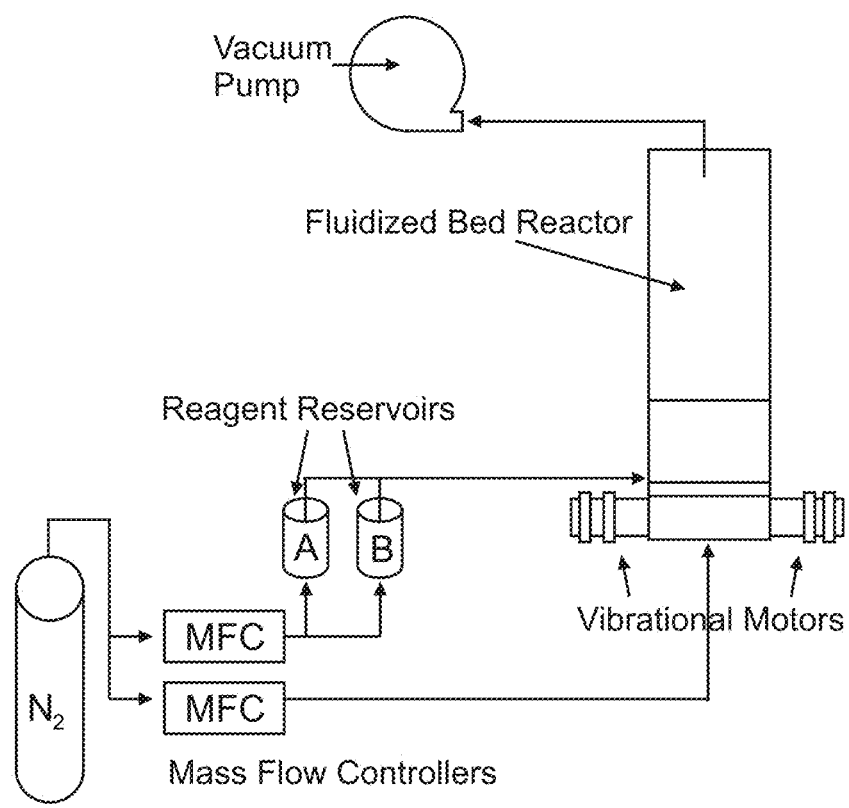
(F) Fluidized bed ALD reactor schematic
Figure 2d: Atomic-Layer-Depostion (ALD)

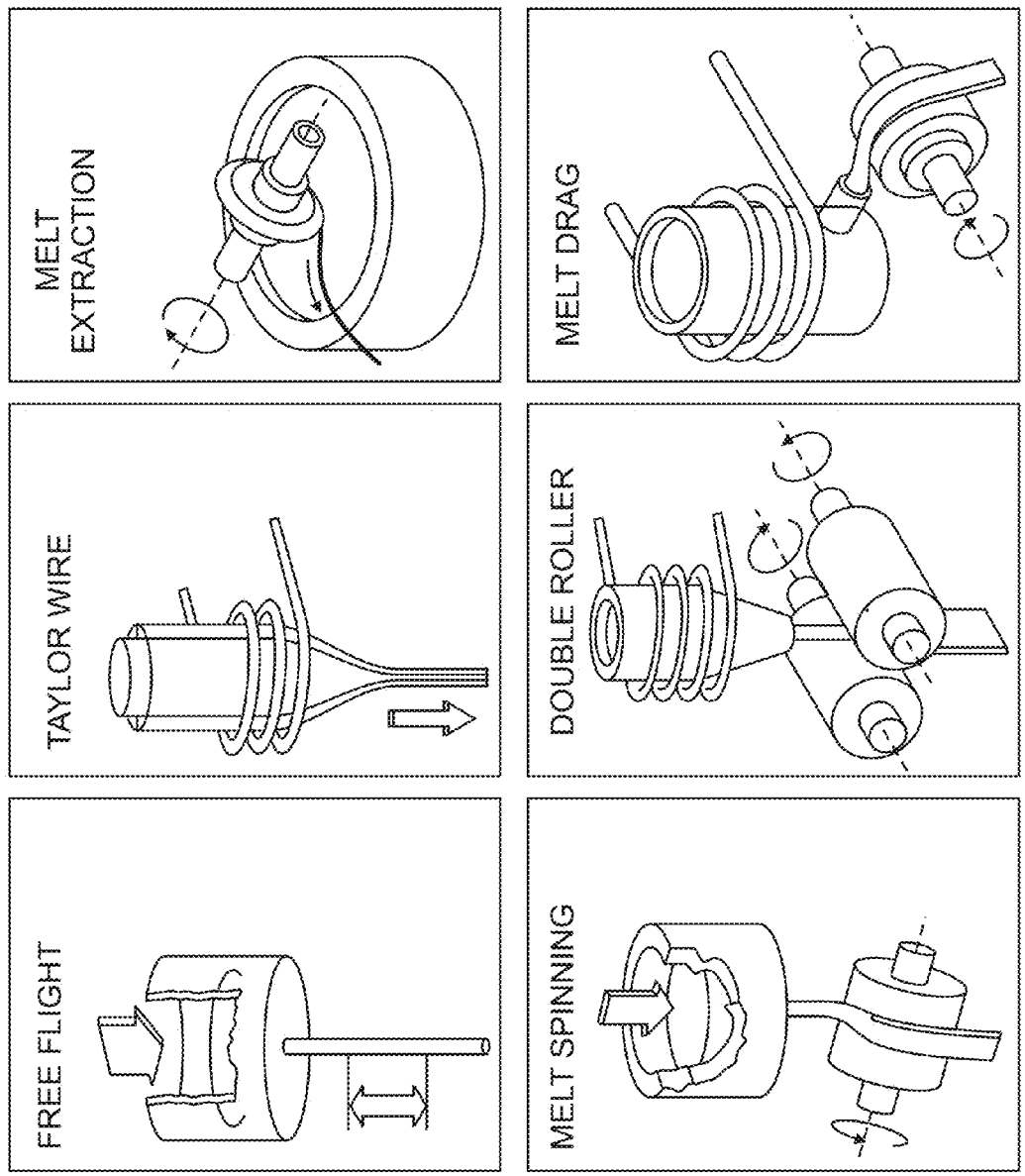
Figure 2e: Melt-Spinning and Melt Extraction

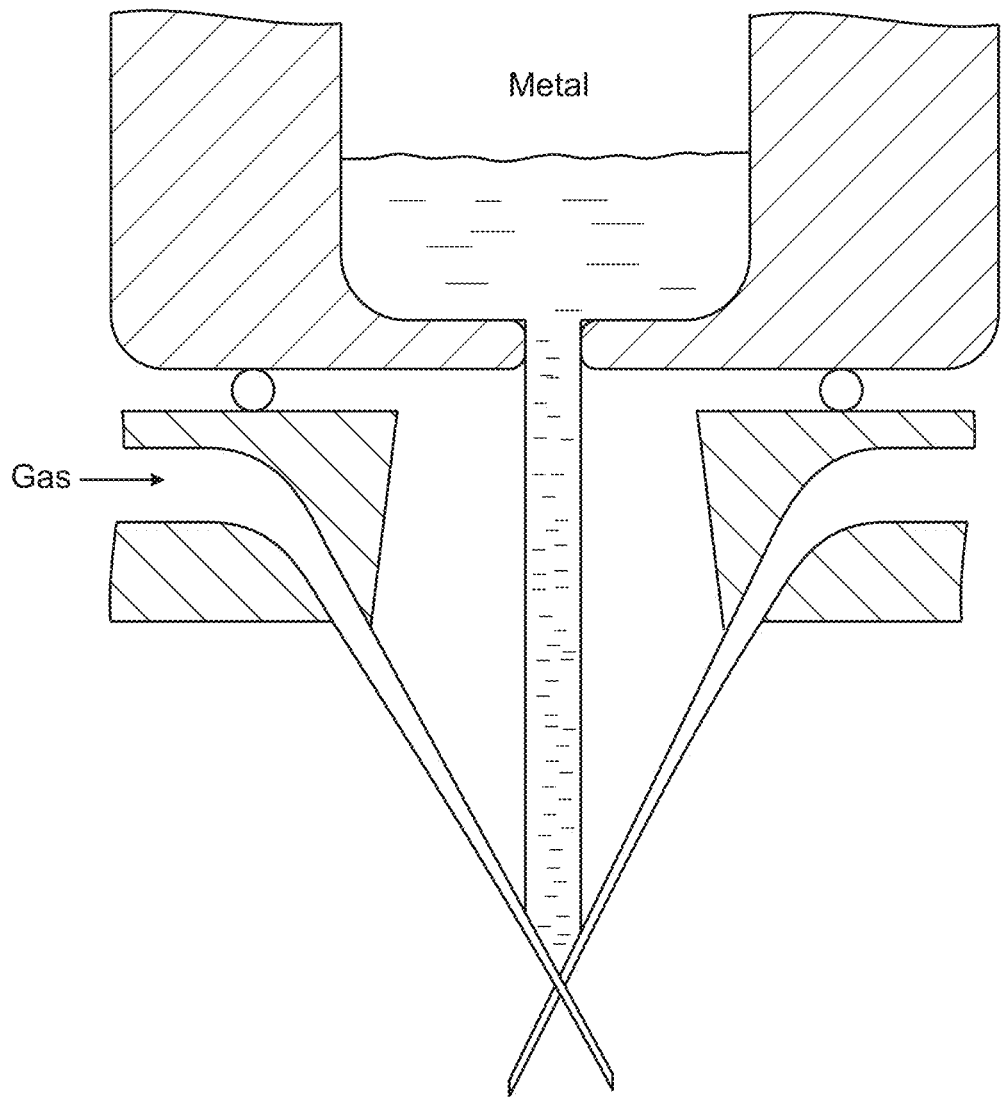
Figure 2f: Gas Atomization

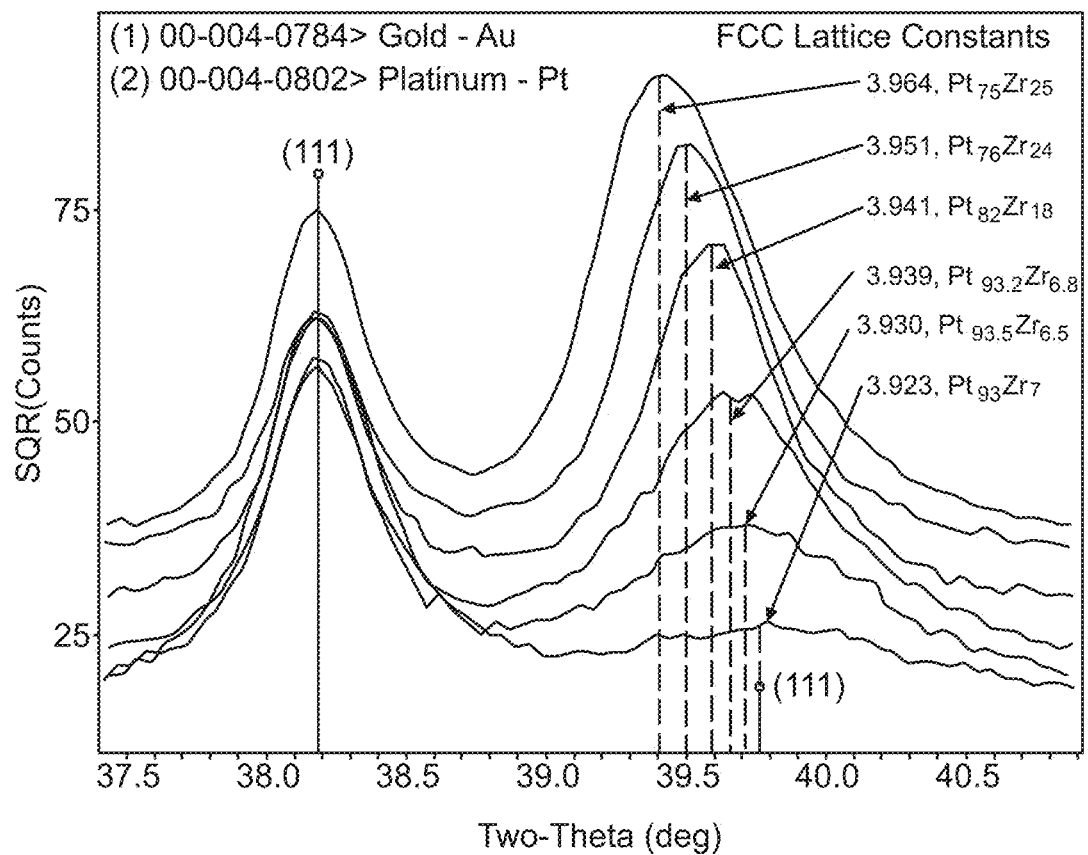
Figure 4b: X-ray Diffraction pattern for $Pt_{1-x}Zr_x$

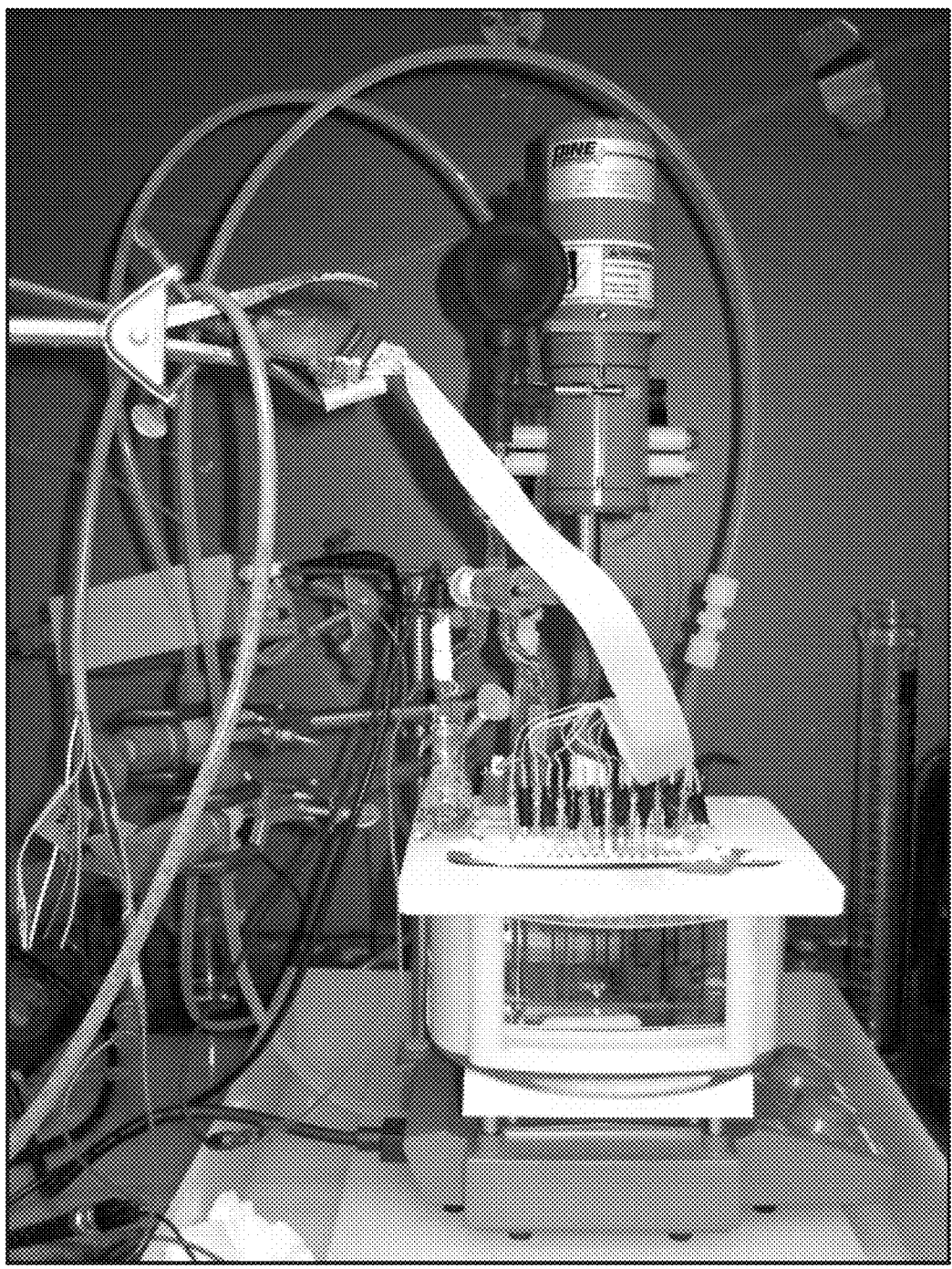
Figure 5a: Custom-built multi-electrode half cell

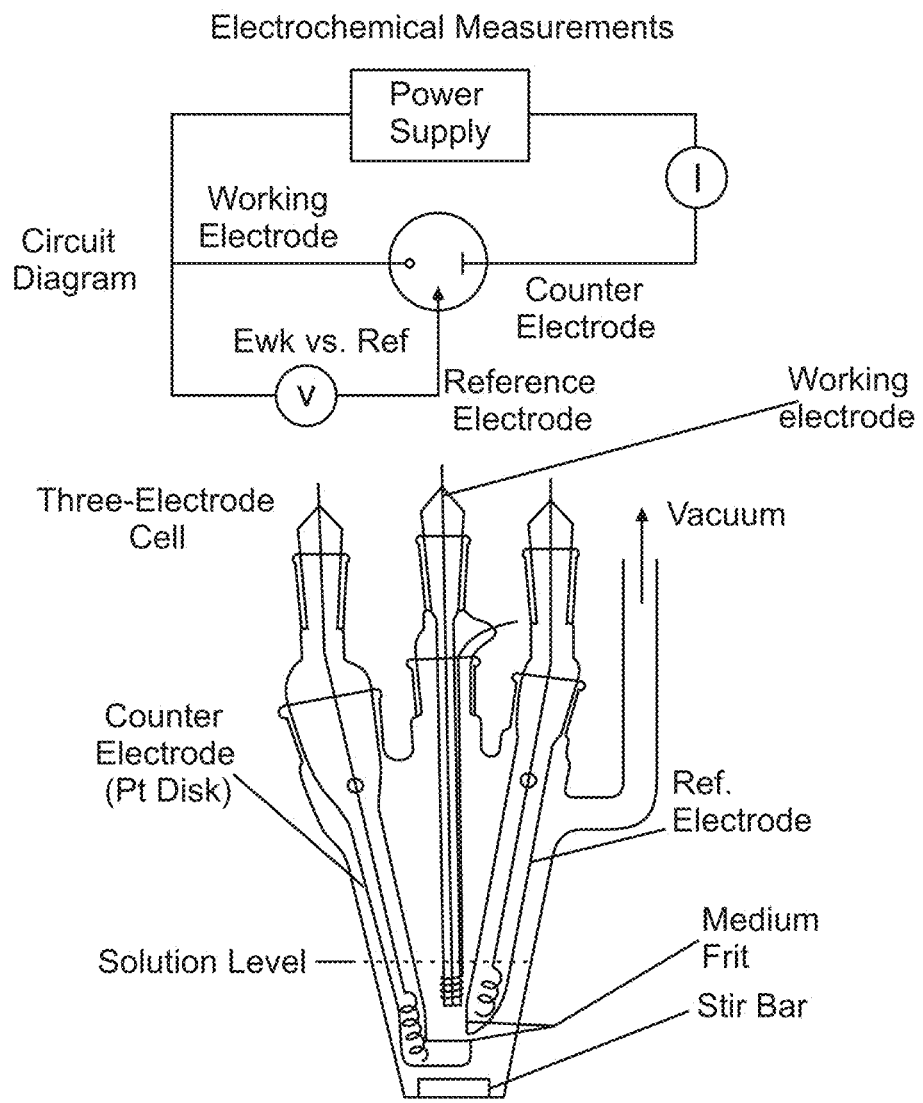
Figure 5b: Schematic of typical half cell

FIG. 7: Durability plot

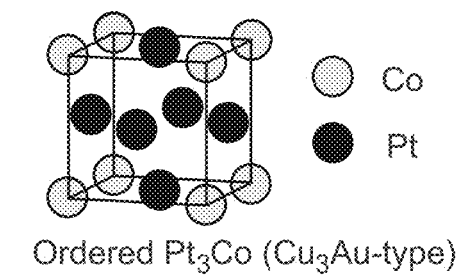
Ordered Pt$_3$Co (Cu$_3$Au-type)
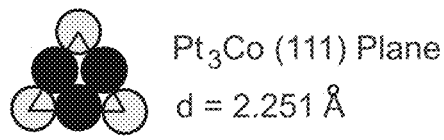
Pt$_3$Co (111) Plane
d = 2.251 Å
| At. % Zr | d (Å) | Film Thickness (nm) |
|---|---|---|
| 0 | 2.245 | 190.5 |
| 3 | 2.249 | 173.5 |
| 0 ? | 2.261 | 155.9 |
| 9 | 2.289 | 109.7 |
| 14 | 2.294 | 86.8 |
| 20 | 2.262 | 88.3 |
Figure 10

Ordered Pt$_3$Zr (Ni$_3$Ti-type)
-DO$_{24}$ Structure Type

J. K. Stalick, R. M. Waterstrat, J. Alloys
and Compounds 430, 2123 (2007)

NANOSTRUCTURED PLATINUM ALLOYS FOR USE AS CATALYST MATERIALS

CROSS REFERENCE TO RELATED APPLICATIONS

This application is a continuation under 35 U.S.C. §120 of co-pending and commonly-assigned U.S. Utility patent application Ser. No. 12/784,466, filed on May 20, 2010, by Sri R. Narayan and Charles C. Hays, entitled "NANOSTRUCTURED PLATINUM ALLOYS FOR USE AS CATALYST MATERIALS,", which application claims the benefit under 35 U.S.C. Section 119(e) of the following and commonly assigned patent applications:

U.S. Provisional Patent Application Ser. No. 61/222,429, filed on Jul. 1, 2009, by Sri R. Narayan and Charles C. Hays, entitled "NANOSTRUCTURED PLATINUM ALLOYS FOR USE AS CATALYST MATERIALS IN FUEL CELLS,"; and U.S. Provisional Patent Application Ser. No. 61/346,428, filed on May 19, 2010, by Charles C. Hays and Sri R. Narayan, entitled "NANOSTRUCTURED PLATINUM ALLOYS FOR USE AS CATALYST MATERIALS,";

all of which applications are incorporated by reference herein.

STATEMENT REGARDING FEDERALLY SPONSORED RESEARCH AND DEVELOPMENT

This invention described herein was made in the performance of work under NASA contract No. NAS7-1407, and is subject to the provisions of Public Law 96-517 (35 U.S.C. 202) in which the Contractor has elected to retain title.

BACKGROUND OF THE INVENTION

1. Field of the Invention

This invention relates to a new composition for use as a catalyst or electro-catalyst material.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Platinum metal, as a discreet nanoparticle or as a film on a nanoparticle support, is the dominant catalyst material for a wide range of catalytic reactions under extreme conditions; e.g., at high temperatures or under acidic environments. Consider the use of Pt catalysts in the Platforming process, first developed in 1949, which enabled the synthesis of gasoline without the addition of lead to the gasoline. Efforts to make the synthesis of gasoline more green include the development of Pt or PtRe catalysts with higher activity or lower Platinum group metal (PGM) loading. In the modern refinery, the Pt-containing catalysts are regenerated once in a six to twenty four month period. The catalyst can be regenerated perhaps 3 or 4 times before it must be returned to the manufacturer for recycling of the PGM catalyst.

In order to reduce vehicle emissions, better catalysts are needed for catalytic converters. In the state-of-the-art (SOA) 3-way catalytic converter, the Pt-based catalysts simultaneously break down the harmful byproducts present in the hot exhaust streams of automobiles exhausts, including: 1) reduction of nitrous oxides to nitrogen and oxygen; 2) oxidation of carbon monoxide to carbon dioxide; and 3) oxidation of unburned hydrocarbon (HCs), according to the following reaction:

$$2CO+2NO \rightarrow 2CO_2+N_2$$

In a 3-way catalytic converter, the Pt or Pt-alloy particles are placed on a high surface area support that is maintained at high temperatures and Pt-based alloys with greater microstructural stability at these temperatures will improve the converter performance over time.

Fuel cells are widely regarded as an alternative to internal combustion engines, and will play a dominant role in a hydrogen economy as power sources for portable power, transportation, and stationary power applications. However, to meet the future requirements outlined by the US Department of Energy, a new class of catalytic materials is required to improve the performance of electrodes used in advanced fuel cell applications [1]. As such, extensive government and industrial research has been performed in an attempt to commercialize fuel cells. In SOA polymer electrolyte membrane fuel cells (PEMFCs) using an acid polymer electrolyte, platinum (Pt) and platinum group metal (PGM) alloy catalysts are used as the cathode material for the reduction of oxygen, and as the anode material for the oxidation of the hydrogen gas fuel.

In either application, the high cost of Pt is an impediment to their use. A significant amount of research is under way to reduce the Platinum group metal (PGM) content in catalytic converters and fuel cells.

Some challenges limiting the widespread application of PEMFCs, that utilize PGM catalysts are: 1) slow kinetics for oxygen reduction; 2) long-term durability issues manifest by metallurgical effects (e.g., Ostwald particle ripening, and surface area loss due to corrosion); and 3) the high cost of platinum.

The reduced PEMFC durability observed in SOA fuel cell systems is driven in large part by the metallurgical changes in the Pt metal used as the cathode for the oxygen reduction reaction (ORR). During fuel cell operation; grain growth (i.e., Ostwald particle coarsening), corrosion of Pt crystals, and the corrosion/gasification of carbon supports under electrochemical polarization are observed, which collectively result in severe cathode degradation. In addition, the optimal performance of SOA PEMFCs is limited by the sluggish kinetics of the ORR on Pt and its alloys; e.g., a large activation potential (i.e., an over-potential $V_{over} \sim 300$ mV) exists even for the SOA catalysts. In new the alloyed catalysts, such as $Pt_3Co$, the durability of polymer electrolyte cell membrane is reduced due to poor corrosion resistance of the cell electrodes, where Co is corroded from the catalyst surface (cathode), and ultimately crosses over into the membrane [2].

In this application, embodiments of the present invention teach a new class of Pt-based catalyst materials. In the description of the catalyst performance, focus on the use of these materials as the cathode material in a PEMFC, and the results presented show that their performance far exceeds that demonstrated by SOA Pt materials, with a greatly reduced Pt content or Pt loading. However, other applications are also disclosed.

SUMMARY OF THE INVENTION

There is provided in the practice of embodiments of this invention, a series of binary and ternary Pt-alloys, that promote the important reactions for catalysis at an alloy surface; oxygen reduction, hydrogen oxidation, and hydrogen and oxygen evolution. The first two of these reactions are essential when applying the alloy for use in a PEMFC.

To overcome the limitations in the prior art described above, and to overcome other limitations that will become apparent upon reading and understanding the present invention, the present invention discloses a platinum (Pt) metal containing alloy composition useful as a catalyst electrode, comprising a film comprising a compound of Pt and at least one early transition metal element A from group IVB or VB of the Periodic table.

The film may comprise a continuous film on a nanoparticle support, a continuous film on a hollow spherical nanoparticle (e.g., nanoshell) support, a continuous film on a micron-sized metallic or non-metallic support, or a continuous film on a wire or wire-gauze support, for example.

There may be less than 50% Atomic % (At. %) Pt in the compound.

Element A may comprise at least one valve metal element of Zirconium (Zr), Titanium (Ti), Hafnium (Hf), and Niobium (Nb). A may comprise at least one of Zirconium (Zr), Titanium (Ti), Hafnium (Hf), and Niobium (Nb), and B may comprise at least one of Cobalt (Co), Nickel (Ni), and Iron (Fe), and with at least one PGM element of Palladium (Pd), Ruthenium (Ru), Rhodium (Rh), Rhenium (Re), Osmium (Os), and Iridium (Ir).

The Pt-containing compound may further comprise at least one late transition metal B, thereby forming a Pt—B-A alloy. For example, A may comprise at least one of Zirconium (Zr), Titanium (Ti), Hafnium (Hf), and Niobium (Nb), and B may comprise at least one of Cobalt (Co), Nickel (Ni), and Iron (Fe). The alloy may be $(Pt_3Co)_{100-y}Zr_y$ with $0 \leq y \leq 30$ (At. %). The alloy may comprise $(Pt_{100-x}Co_x)_{100-y}Zr_y$ with $0 \leq x \leq 80$ and $0.5 \leq y \leq 60$.

The Pt-containing compound may further comprise at least one platinum group metal (PGM), thereby forming a Pt-PGM-B-A alloy, wherein the PGM element comprises at least one of Palladium (Pd), Ruthenium (Ru), Rhodium (Rh), Rhenium (Re), Osmium (Os), and Iridium (Ir).

The alloy may be crystalline, for example, nanocrystalline with a grain size of no more than 100 nm, or nanocrystalline with a preferred grain size of less than 10 nm. The alloy may have a (111) crystallographic orientation.

An amount of A and an amount of Pt in the film may be such that that the film is at least 2 times more electrochemically active, in an oxygen reduction reaction (ORR), than Pt. An amount of A and the amount of Pt in the film may be such that the film is electrochemically stable, with no decrease in electrochemical activity of the film used with an electrolyte. To determine the durability of said alloy, the electrochemical activity is characterized by conducting multiple cyclic voltammograms (CV) over a potential range of 0.0 to at least 1.2 Volts (vs. NHE), with a potential scan rate of the order 100 mV/sec, and a total number of cycles exceeding N=1000. For durable compositions, the current density at 0.9 V (vs. NHE) should not decrease on electrochemical cycling, within the measurement accuracy (e.g., +/−10 microamps).

The electrolyte may be an acid electrolyte. The acid electrolyte may be a mixture of perchloric acid in water ($HClO_4$/$H_2O$) (e.g., a 1 molar perchloric acid concentration in water ($HClO_4$/$H_2O$)), or mixture of sulfuric acid in water ($H_2SO_4$/$H_2O$) (e.g., a 1 molar sulfuric acid concentration in water ($H_2SO_4$/$H_2O$). The acid electrolyte may saturate a polymer exchange membrane electrolyte (e.g. Nafion).

For example, synthesized Pt—Co—Zr thin films are stable in 1 M perchloric acid and are electrochemically active for the oxygen reduction reaction, with kinetic currents at 0.9 V (that greatly exceed those of Pt, by amounts as great as thirty times [30×]).

The present invention further discloses a platinum (Pt) metal containing alloy composition useful as a catalyst electrode, comprising a nanoparticle comprising a compound of Pt and at least one early transition metal element A from group IVB or VB of the Periodic table.

The present invention further discloses a platinum (Pt) metal containing alloy composition useful as a catalyst electrode, comprising a metallic nanocrystalline cluster or quantum dot on a nanoparticle support, wherein the metallic nanocrystalline cluster or quantum dot comprises a compound of Pt and at least one early transition metal element A from group IVB or VB of the Periodic table.

BRIEF DESCRIPTION OF THE DRAWINGS

Referring now to the drawings in which like reference numbers represent corresponding parts throughout:

FIG. 1 is a fuel cell comprising electrodes according to the present invention;

FIGS. 2a-2g are schematics of co-sputtering, electron beam evaporation, vapor phase condensation, atomic layer deposition, melt spinning and melt extraction, gas atomization, and rotary atomization processes, that may be used to fabricate the compositions of the present invention;

FIGS. 4a and 4b show X-ray diffraction results for $Pt_3Co$ to $Pt_{53}Co_{20}Zr_{27}$ films, and $Pt_{100-x}Zr_x$ films, respectively.

FIG. 5a is an image of an electrochemical measurement set up and FIG. 5b is a schematic of a typical electrochemical half cell;

FIG. 10 is a schematic of the binary $Pt_3Co$ composition showing the 111 plane;

DETAILED DESCRIPTION OF THE INVENTION

Figure 2G:
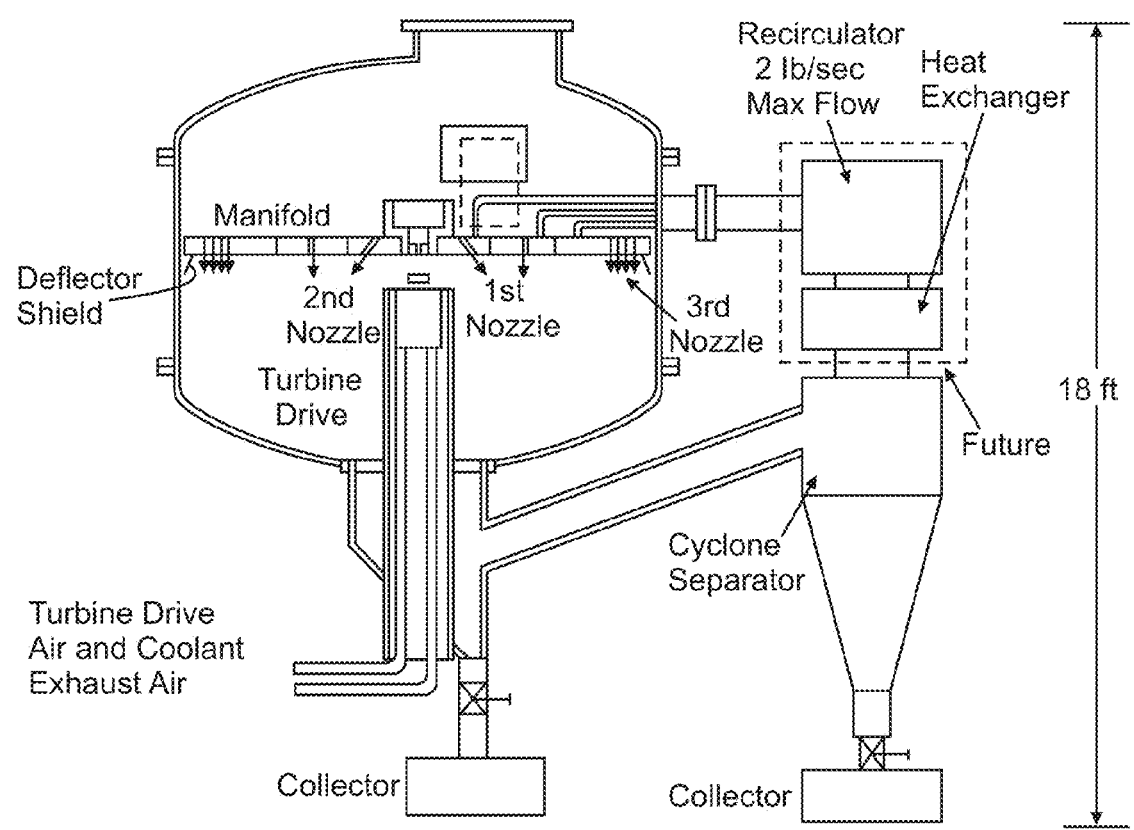

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Two series of Pt-based alloys, in thin film form, have been prepared by co-sputtering. As examples, the present invention shows that members of two platinum-metal containing composition manifolds are stable in acid solutions, and exhibit electro-catalytic performance that meets or exceeds that of pure Pt metal. Examples of the two platinum metal containing composition manifolds are A) $(Pt_{100-x}Co_x)_{100-y}Zr_y$, $0 \leq x \leq 80$, and $0.5 \leq y \leq 60$ (At. %); and B) $Pt_{100-x}Zr_x$, $8 < x < 33$ (At. %).

Thus, the compositions of the present invention may be useful in any applications that would benefit from electro-catalytic performance. For example the new Pt-based alloy catalysts of the present invention may be useful as electrodes in a fuel cell, as illustrated in FIG. 1. The fuel cell typically comprises an electrolyte between the anode and the cathode. The composition of the present invention may be used as a cathode and/or an anode in the fuel cell.

Fabrication

Combinatorial film deposition methods, as described in [1], were used to simultaneously prepare a wide range of Pt—Co—Zr compositions for evaluation. Using a high-throughput, co-sputtering, synthesis technique, an array of thin film specimens in the ternary alloy series $(Pt_3Co)_{100-x}Zr_x$, $0 \leq x \leq 30$ (At. %), were simultaneously prepared.

FIG. 2a shows a schematic of the co-sputtering process. All films were co-sputtered from two targets, each made from research grade materials, with minimum purities of 99.99%; $Pt_3Co$ and Zr (Kurt J. Lesker). A typical co-sputtering procedure comprises evacuating the sputtering chamber to a base chamber pressure of $<1 \times 10^{-6}$ Torr, followed by film deposition carried out under an Argon gas pressure of 15 mTorr.

A multi-electrode array comprising of 18 thin film electrodes were deposited using a three-step physical masking method. First, an 18-segment current collector array was fabricated using a nanostructured Au thin film over a Ti adhesion layer. The average Au grain size was 40-50 nm. The Au/Ti films were sputtered through a patterned mask onto a polished borosilicate glass substrate, with nominal dimensions of 4"×5"×⅛". The Au films were strongly oriented, with a (111) crystallographic orientation.

The Pt—Co—Zr catalyst films were co-sputtered after physically masking off an equally spaced array of ⅛"×⅛" openings, each placed above the Au current collector structure. The individual films were deposited onto an 18-segment current collector structure comprised of nanostructured Au thin films, with average Au grain size of 40-50 nm.

FIG. 2b illustrates an electron beam evaporation apparatus [12] that can be used to deposit the Pt films of the present invention, comprising a heatable substrate holder, quartz crystal, shutter, crucible, and 4-pocket e-beam evaporator.

FIG. 2c illustrates a vapor phase condensation apparatus [6] that can be used to synthesize the Pt alloys of the present invention in particulate form, comprising a vacuum chamber with computerized process control comprising a heating element (e beam evaporator), power supply, powder, quenchant gas. Powder collection and final packaging is also shown.

FIG. 2d illustrates an atomic layer deposition (ALD) apparatus [7] (fluidized bed ALD reactor schematic) that can be used to deposit the Pt films of the present invention, comprising Mass Flow Controllers (MFC), Nitrogen Source $N_2$, reagent reservoirs A and B, vibrational motors, fluidized bed reactor, and vacuum pump.

FIG. 2e illustrates an melt spinning and melt extraction apparatus [8] that can be used to synthesize the Pt alloys of the present invention in thin ribbon or fine wire form, comprising melt spinning, double roller, melt drag, free flight, taylor wire, and melt extraction.

FIG. 2f illustrates Gas Atomization apparatus [9] that can be used to synthesize the Pt alloys of the present invention in powder form, comprising gas and metal source.

FIG. 2g illustrates a centrifugal atomizer [10] that can be used to synthesize the Pt alloys of the present invention in powder form, comprising turbine drive air and coolant exhaust air, collectors, deflector shield, manifold, $2^{nd}$ nozzle, $1^{st}$ nozzle, recirculator, heat exchanger, and cyclone separator.

Figure 3:
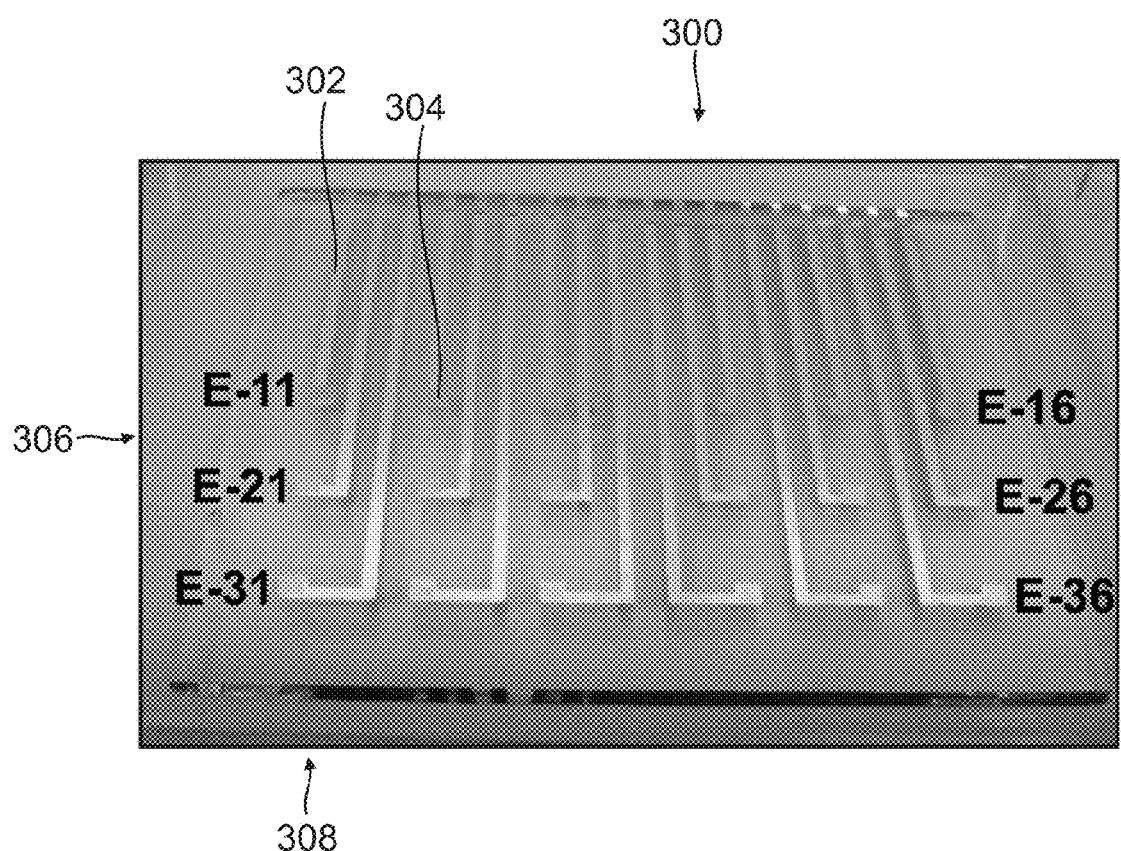
FIG. 3 is a photograph of an 18 electrode Pt—Co—Zr thin film array, showing electrodes upon which samples E11-E36 are deposited.

FIG. 3 shows the collector structure 300 comprising 18 thin film electrodes 302 of Au thin films disposed in an array, with different PtCo and PtCoZr samples 304 deposited thereon. The samples 304, labeled E-ab depending on their position on the array, comprise different compositions having different amounts of Pt, Co and Zr, where "a" corresponds to the row number 306 and "b" corresponds to the column number 308. For example, sample E-11 is positioned in the first row and first column.

Experimental Characterization of the Films

Structure

Figure 4A:
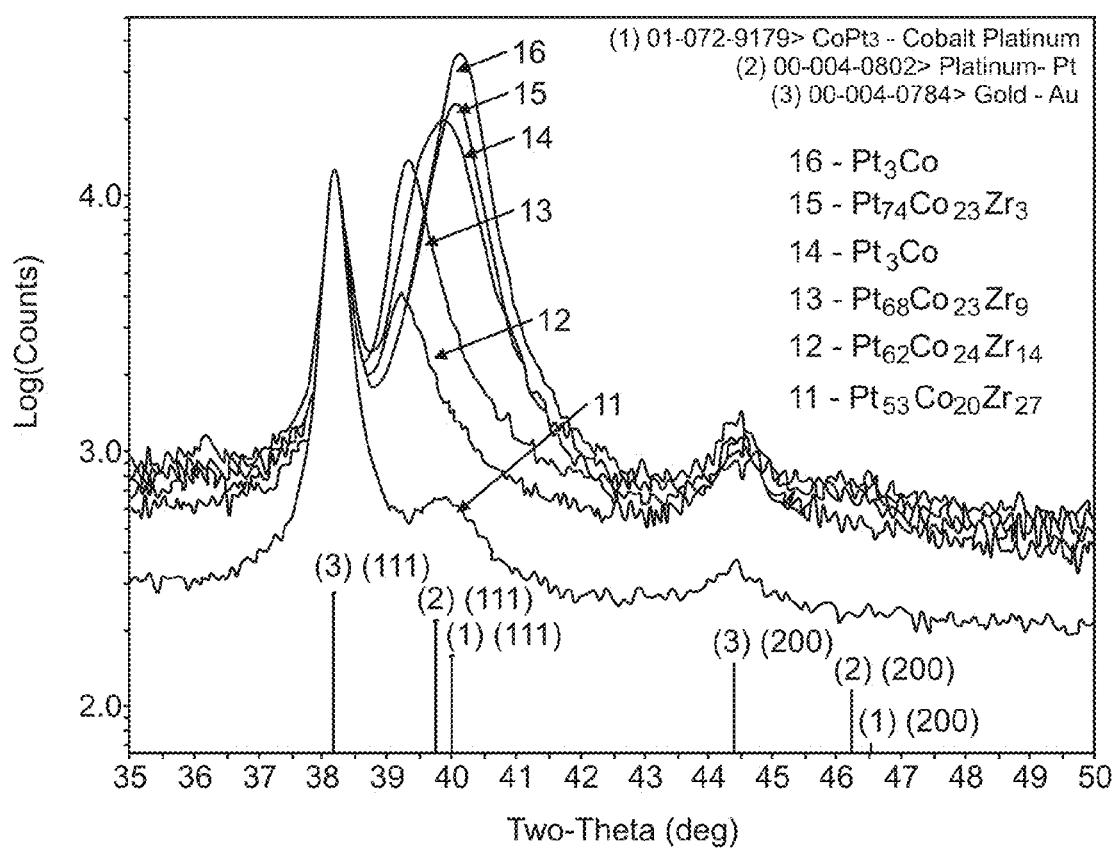

FIGS. 4a and 4b illustrate X-ray diffraction (XRD) data for a platinum (Pt) metal containing alloy composition for use as a catalyst electrode, comprising a film including a compound of Pt and at least one early transition metal element A from group IVB or VB of the Periodic table. In this example, the Pt-containing compound further comprises at least one late transition metal B, thereby forming a Pt—B-A alloy.

FIG. 4a shows the Au films were strongly oriented, with a (111) crystallographic orientation. Also shown in FIG. 4a are the XRD patterns for six films from the array, wherein nominal compositions from $Pt_3Co$ (16) to $Pt_{53}Co_{20}Zr_{27}$ (11 or E-11) are shown. Each of the Pt—Co—Zr thin films exhibits a (111) crystallographic orientation. Some additional lines in the spectra indicate the presence of some grains with differing orientation. The decreased intensity for $Pt_{53}Co_{20}Zr_{27}$ is consistent with the reduced thickness of the films in this part of the array. As shown in FIG. 4a, the X-ray spectra reveal that there appears to be a smooth increase in the lattice parameter with increasing x, moving from $Pt_3Co$ (a=2.245 Å, $Cu_3Au$ structure type) to $Pt_{62}Co_{24}Zr_{14}$ (a=2.294 Å). For x>14%, the lattice parameter decreases.

As shown in FIG. 4b, the X-ray spectra for $Pt_{100-x}Zr_x$ reveal that there appears to be a smooth decrease in the lattice parameter with decreasing x, moving from ~$Pt_3Zr$ (a=3.964 Å, $Ni_3Ti$ structure type) to $Pt_{93}Zr_7$ (a=3.923 Å, Pt-ric, $Pt_4Zr$ structure type [i.e., $Cu_3Au$ type]).

Figure 4C:
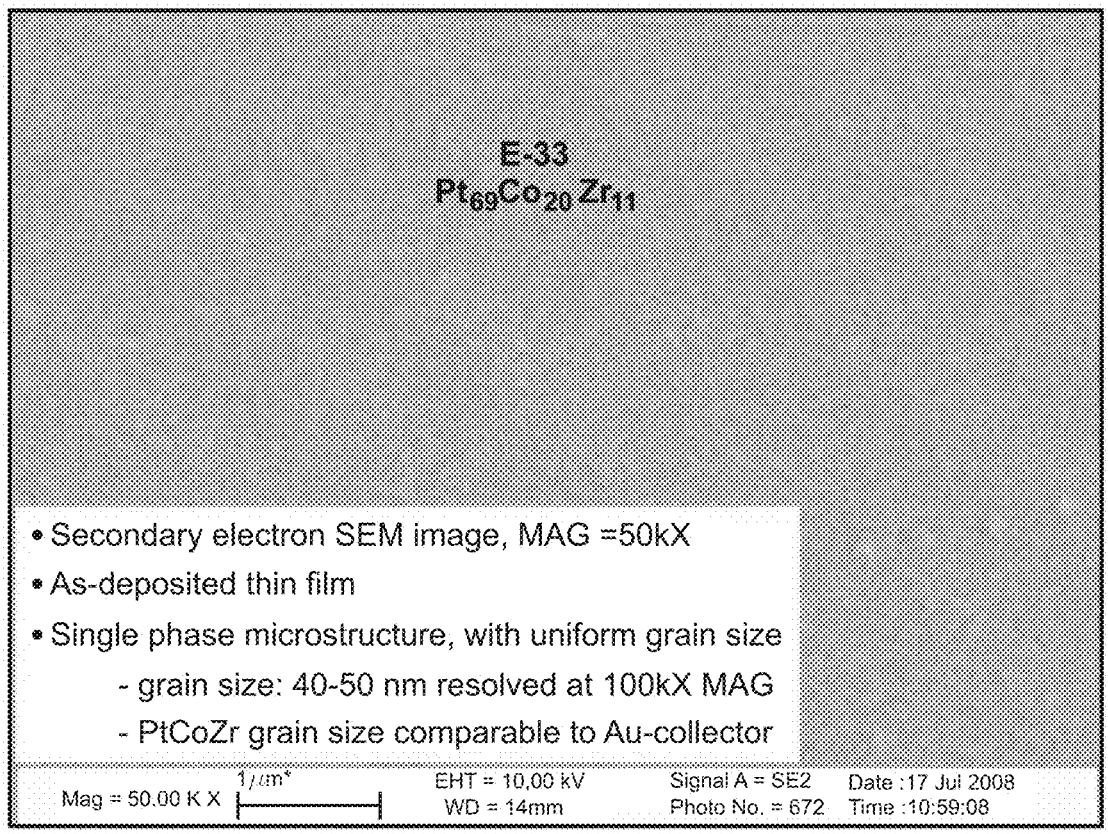
FIG. 4c is a secondary electron scanning electron microscope (SEM) image of the top surface of sample E33, a $Pt_{69}Co_{20}Zr_{11}$ as deposited thin film (50,000× magnification), showing single phase microstructure, with uniform grain size (40-50 nm resolved at 100,000× magnification), wherein the PtCoZr film's grain size and crystallographic orientation (111) are comparable to the grain size of the underlying Au-film on which it was deposited.

FIG. 4c shows SEM images of the compositions of the present invention, showing single phase microstructure, with uniform grain size (40-50 nm).

Electrochemical Properties

The electrochemical properties of the $(Pt_3Co)_{1-x}Zr_x$ films were measured using a high-throughput, multi-electrode, screening technique developed at Nasa's Jet Propulsion Laboratory. This technique enables the simultaneous evaluation of polarization behavior, active area, and durability for multiple thin film specimens.

FIGS. 5a and 5b illustrate electrochemical measurement set ups used for the measurements of the present invention [11].

The results of these electrochemical measurements show that a wide range of compositions within the $(Pt_3Co)_{100-x}Zr_x$ composition manifold are stable in acid solutions (e.g., 0.1 M $HClO_4/H_2O$ electrolytes). This stabilization has been achieved by the addition of early transition-metal (ETM) elements from groups IVB and VB of the periodic table (e.g., Ti, Zr, Hf, and Nb). The addition of the ETM element(s) also enables the addition of late transition metal (LTM) moieties (e.g., Ni, Co, and Fe), thereby reducing the Pt-metal content further.

In order to exhibit electro-catalytic behavior, the films of the present invention were electrochemically prepared by applying a voltage to the films (with respect to a normal hydrogen electrode (NHE) defining 0 volts), wherein the voltage was ramped from 0 to 1.2 V and the ramping was repeated or cycled over a sufficient number of cycles (approximately 100 cycles). After sufficient number of cycles (e.g., 100 cycles), the film exhibits electrochemical characteristics.

Anodic Behavior

The films of the present invention may be used as an anode to catalyze a hydrogen oxidation reaction.

Figure 6:
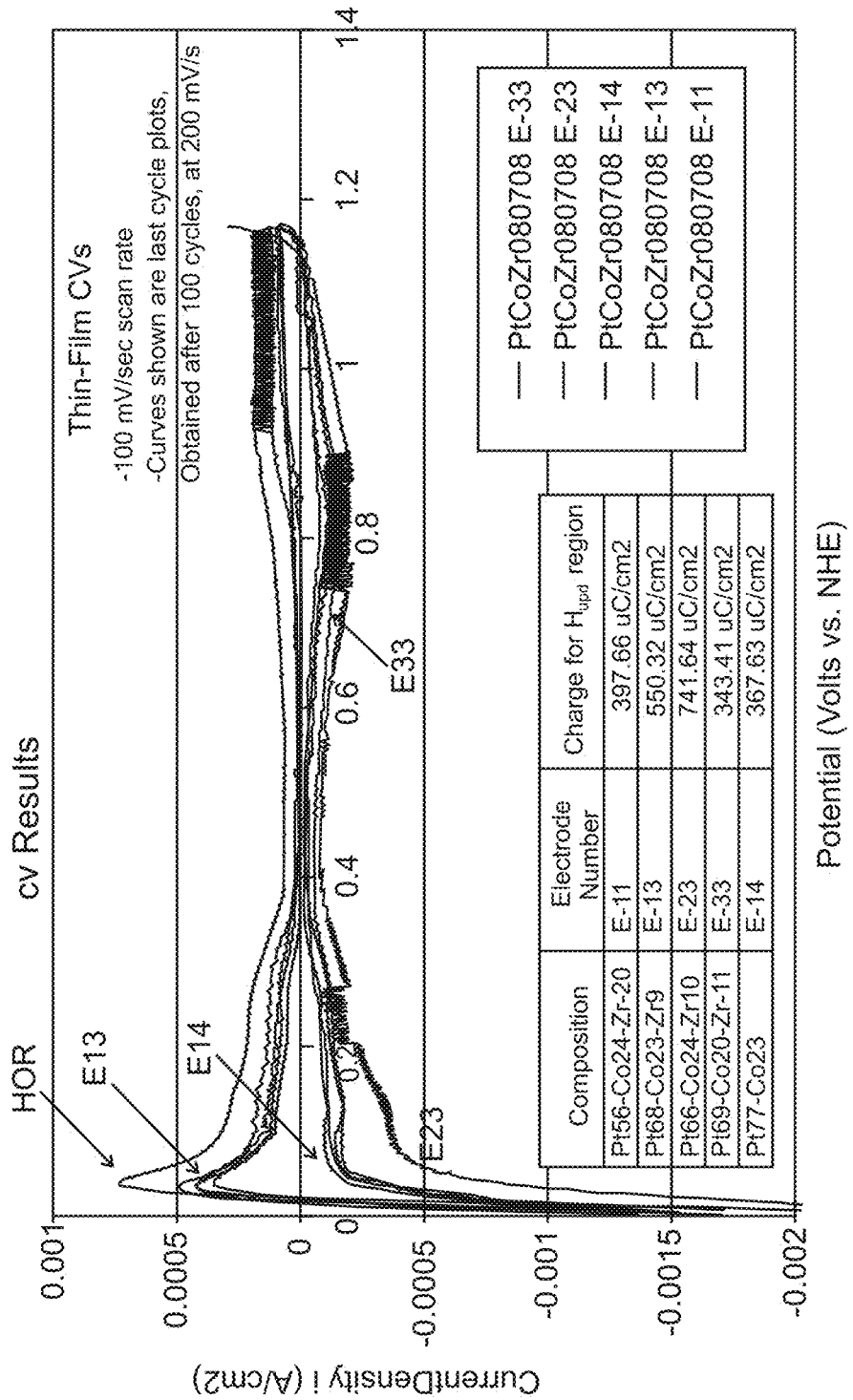
FIG. 6 shows voltammograms (CV), plotting current (amps) as a function of voltage applied to PtCoZr and PtCo films (voltage with respect to a normal hydrogen electrode defining 0 volts), for samples E11, E13, E23, E33 and E14 using the PtCoZr multi-electrodes array of FIG. 3 and the multi electrode half cell set up of FIG. 5a, wherein the voltage is scanned at a 100 mV/second scan rate and the curves shown are the last cycle plots obtained after 100 cycles; the surfaces were prepared by conducting 100 cycles at 200 mV/second scan rate over the same potential range.

Electro-catalytic behavior is demonstrated by the results presented in FIG. 6, which shows a cyclic voltammogram (CV), taken using the set ups in FIGS. 5a and 5b, for the compositions E11, E13, E23, E33 and E14 which exhibit a (111) crystallographic orientation. This CV was conducted at a scan rate of 100 mV/sec, in a de-aerated 0.1 M $HClO_4/H_2O$ electrolyte. Note that the hydrogen oxidation peaks 600 are those associated with the Pt(111) or PtCo(111) crystal faces [active Pt-site area values in Table-1].

The hydrogen oxidation reaction (HOR) peak is a direct measurement of the oxidation of hydrogen to produce electron(s) ($e^-$) and a hydrogen nucleus ($H^+$), catalyzed by the composition of the present invention acting as an electrode (anode), and according to the reaction:

$$H_2 \rightarrow 2H^+ + 2e^-$$

This is the reaction typically catalyzed by an anode, for example in a fuel cell, in the presence of hydrogen (in this case, the hydrogen is the fuel). The area under the peaks labeled HOR in FIG. 6 (active area $A_{active}$) is directly proportional to the amount of charge (electrons) generated by the reaction and catalyzed by the Pt sites at the anode, and therefore is a good figure of merit for the anodic performance of the composition of the present invention. The larger the area under the peaks (e.g. HOR), the more charge (or electrons) generated, and the better the performance as an anode. More specifically, the active area represents charge resulting from the underpotential deposition of hydrogen ($H_{upd}$) onto the composition acting as an anode.

Table 1 lists the active areas for various compositions of the present invention, as calculated by integrating the curves, between 0 and 0.4 V vs. NHE, in FIG. 6, and dividing by the geometric surface area of the film being used as an electrode.

TABLE 1

| Composition | Sample | Charge for $H_{upd}$ region Active Area ($A_{active}$) | Film thickness (nm) |
|---|---|---|---|
| $Pt_{56}Co_{24}Zr_{20}$ | E-11 | 397.66 μC/cm² | 88.3 |
| $Pt_{68}Co_{23}Zr_9$ | E-13 | 550.32 μC/cm² | 105.9 |
| $Pt_{66}Co_{24}Zr_{10}$ | E-23 | 741.64 μC/cm² | 137.8 |
| $Pt_{69}Co_{20}Zr_{11}$ | E-33 | 343.41 μC/cm² | 123.7 |
| $Pt_{77}Co_{23}$ | E-14 | 367.63 μC/cm² | 160.4 |

$A_{active}$ for a Pt film containing only Pt (pure Pt) is 210 μC/cm². Thus, the data in Table 1 and FIG. 6 illustrate the films of the present invention have greater $A_{active}$ as compared to a pure Pt film. Moreover, FIG. 6 shows the remarkable result that reducing the amount of Pt in the alloy electrode may increase the electrochemical performance of the Pt alloy electrode.

Durability (Non-Corrosive Properties)

Figure 7:
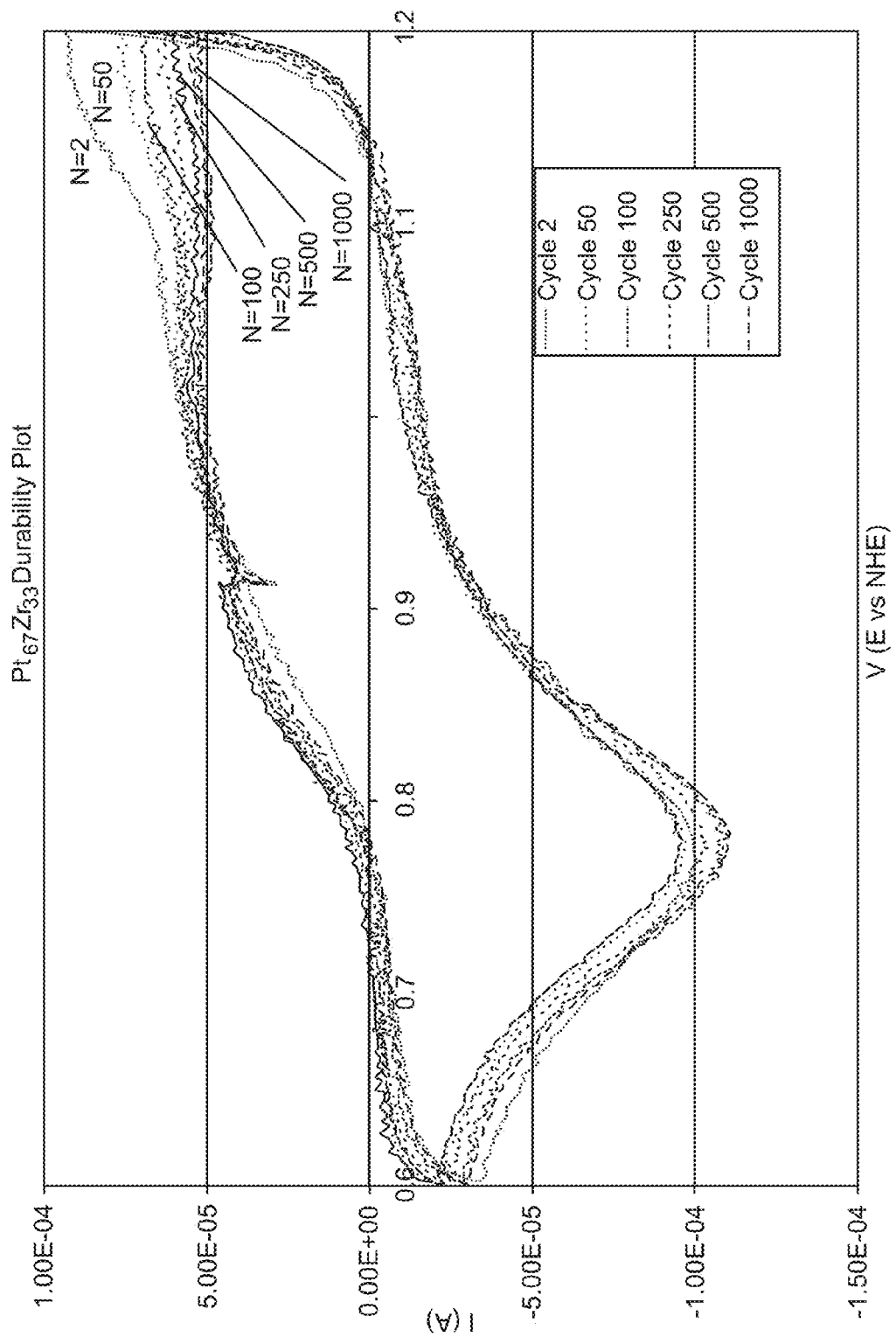
FIG. 7 is a durability plot for a $Pt_{67}Zr_{33}$ film, showing multiple cyclic voltammograms taken after the film has been electrochemically prepared (by e.g., by cycling voltage over 100 cycles), with the individual voltammograms shown after conducting N=2, 50, 100, 250, 500, and 1000 cycles.

FIG. 7 is a durability plot for a $Pt_{67}Zr_{33}$ film, illustrating that compositions of the present invention do not corrode (to within the measurement accuracy) over a period of more than 1000 cycles. FIG. 7 compares the voltammogram taken after the film has been electrochemically prepared (by e.g., by cycling voltage over 100 cycles), with the voltammogram taken after 1000 cycles. The voltammograms are identical, to within the measurement accuracy of the experiment.

The durability of these compositions may exceed that of pure Pt, as the arrays have been extensively cycled (n>$10^3$ cycles) over the potential range 0.0 to 1.2 V, with no degradation of the electrode surface or decrease in electrochemical performance observed. Although not reported, representative electrodes of the Pt—Co—Zr thin films prepared have been cycled over the potential range 0.6-1.2 V, at a scan rate of 200 mV/sec, for at least 3000 cycles with no degradation in performance. These results suggest that alloys in Pt—Co—Zr composition manifold can be as active as Pt catalysts, although with much reduced Pt-loadings; i.e., with just ~50% of the amount of platinum metal.

Cathodic Behavior

The films of the present invention may be used as a cathode in the presence of, e.g., oxygen, to catalyze the reduction of the oxygen in an oxygen reduction reaction (ORR) (reacting the oxygen with, e.g., hydrogen ions produced at the anode).

Figure 8:
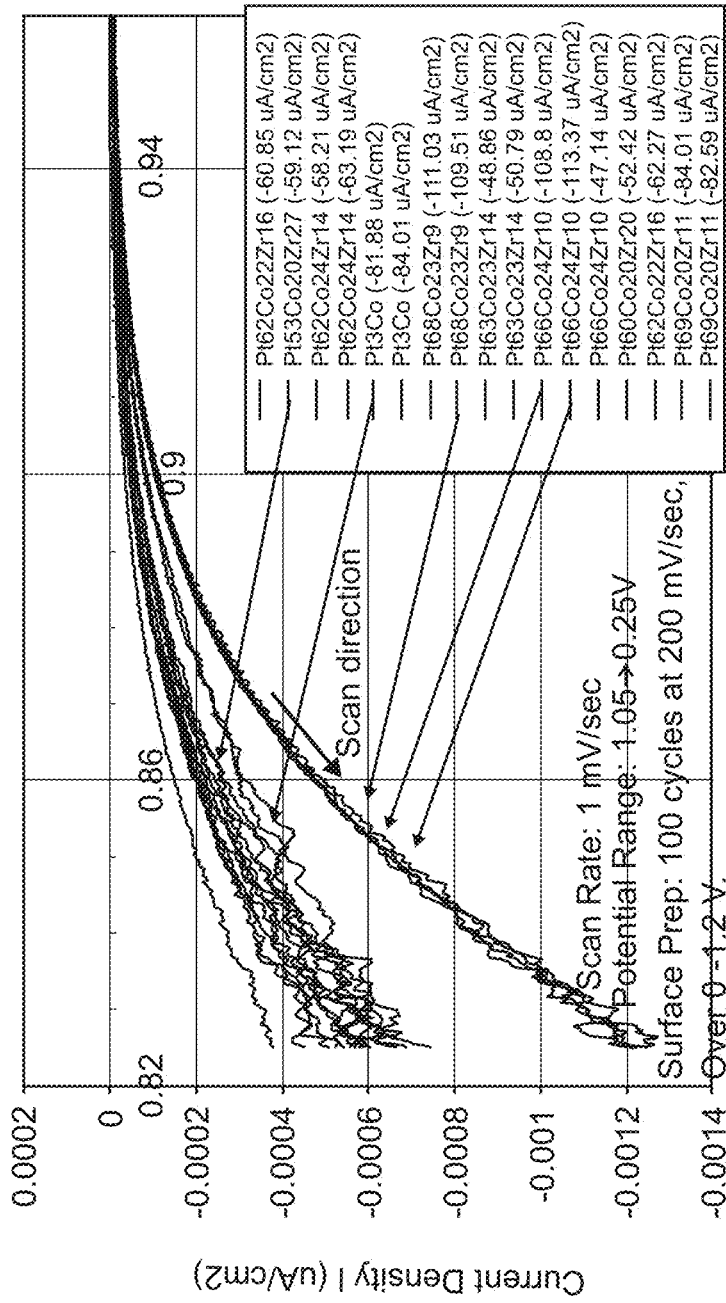
FIG. 8 shows nearly potentiostatic polarization curves in the kinetic region for the ORR, for various PtCoZr and PtCo compositions, wherein current density (microamps/$cm^2$) is plotted as a function of voltage applied to the PtCoZr and PtCo films (voltage with respect to a normal hydrogen electrode defining 0 volts), the voltage is ramped from 1.05 V to 0.25 V at a 1 mV/second scan rate, and the measurements of FIG. 8 are taken after the surface of the films has been prepared by performing 100 voltage cycles over 0 V to 1.2 V at a 200 mV/second scan rate.

For example, FIG. 8 illustrates the $(Pt_3Co)_{100-x}Zr_x$ thin film compositions synthesized are also electrochemically active for the ORR, a key point for application as a cathode material in an advanced fuel cell. FIG. 8 shows the results of potentiostatic polarization measurements conducted in a fully oxygenated 0.1 M $HClO_4/H_2O$ electrolyte, using the set up of FIGS. 5a and 5b.

The ORR current is measured as a function of voltage applied to the film (voltage with respect to a normal hydrogen electrode defining 0 volts), in the presence of the oxygen in the electrolyte, wherein the voltage is swept at 1 mV/sec, from 1.05 V to 0.25 V (cathodic sweep). Large values for the ORR current density ($\mu A/cm^2$) at 0.9 V (vs. NHE), is indicative of better cathodic performance. The cell current is divided by the geometric surface area of the film being used as an electrode to obtain current density. The data shown are for the ORR kinetic region of the polarization measurement and are taken after the surface of the films has become electrochemically active by performing 100 voltage cycles over 0 V to 1.2 V at a 200 mV/second scan rate. The ORR data were quite reproducible for the alloys shown, with independent measurements providing nearly identical results.

Figure 9:
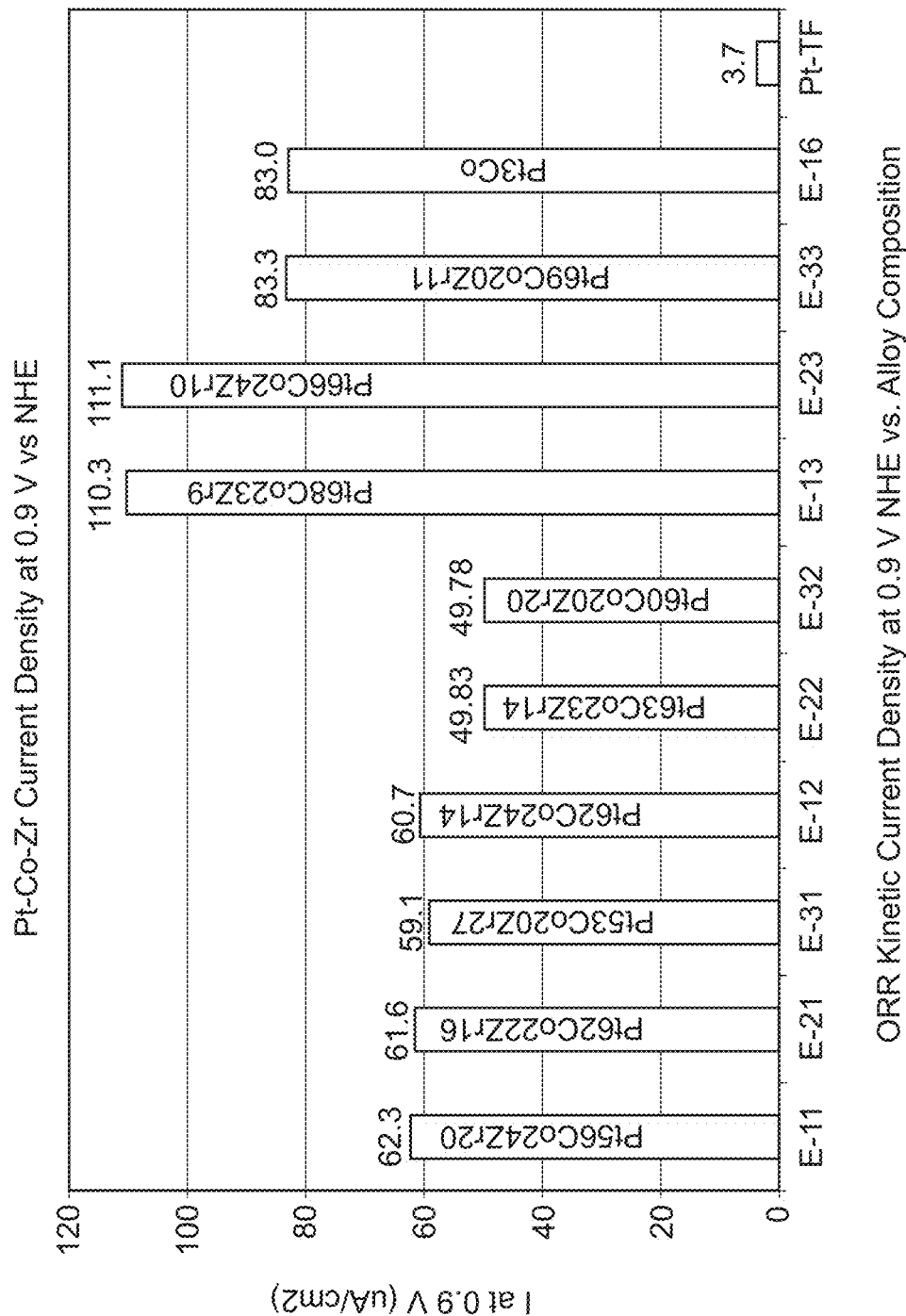
FIG. 9 shows ORR current density (at 0.9 V vs. NHE) for different alloy compositions of the present invention, wherein the ORR current density for a Pt thin film (Pt-TF) is also shown.

FIG. 9 shows ORR current density for a voltage of 0.9 V vs NHE, for different alloy compositions of the present invention, wherein the ORR current density for a Pt thin film (Pt-TF) is also shown. The current density is normalized to the geometric area of the electrodes. FIG. 9 shows that the (111) oriented $Pt_{66}Co_{24}Zr_{10}$ surface is ~30 times more active than the (111) Pt film measured in the same cell. The (111) $Pt_{53}Co_{20}Zr_{27}$ surface is still ~17 times more active than Pt. The $Pt_3Co$ current densities in this array, ~83 $\mu Amps/cm^2$, are ~22 times greater than (111) Pt, in agreement with the literature. This behavior may be related to the intraalloy electron transfer between Pt/Co and Zr, and the d-band filling with x in these new ternary alloys.

While FIG. 9 shows that Pt—Co—Zr compositions with approximately 10% Zr are the best performers, given the high cost of Pt (~$2000 per ounce currently), for some applications it may be advantageous to use less Pt, such as $Pt_{53}Co_{20}Zr_{27}$ (sample E-31 with 53% Pt content), which still shows approximately 17 times enhancement over a pure Pt thin film cathode. The present invention illustrates that a cost vs. performance trade-off may be considered depending on the application.

Binary Compound

In a parallel study, the present invention has examined the properties of specific compositions in the binary alloy series, $Pt_{100-x}Zr_x$, 8<x<33 (At. %). The present invention has synthesized two compositions, in thin film form, via co-sputtering. Both chemical compositions; e.g., 1) x=8; and 2) x=33, illustrate the great potential of alloys in this binary series. As with the Pt—Co—Zr thin film compositions prepared, the $Pt_{100-x}Zr_x$ alloys are stable in 0.1 M Perchloric acid and are electrochemically active for the ORR, with kinetic currents at 0.9 V that exceed elemental Pt. The 0.9 V (vs. NHE) enhancements of the ORR geometric current densities for $Pt_{100-x}Zr_x$, are ~2.5× greater for x=33, and 5.5× greater for x=8, respectively.

FIG. 10 is a schematic illustrating the atomic positions of the Pt and Co in the $Pt_3Co$ crystal. Also shown in FIG. 10 is the (111) plane.

The chemical stability for the binary $Pt_{100-x}Zr_x$ alloys (with x=8 and x=33) is manifest in cyclic voltammograms much like those shown in FIG. 6, and for x=33 in FIG. 7.

The present invention has also synthesized a $Pt_3Co$ (sample E-13). The $Pt_3Co$ sample also shows a good ORR kinetic current that is approximately 24 times greater than the ORR of a pure Pt film of comparable thickness, at 0.9 V vs. NHE.

Figure 11A:
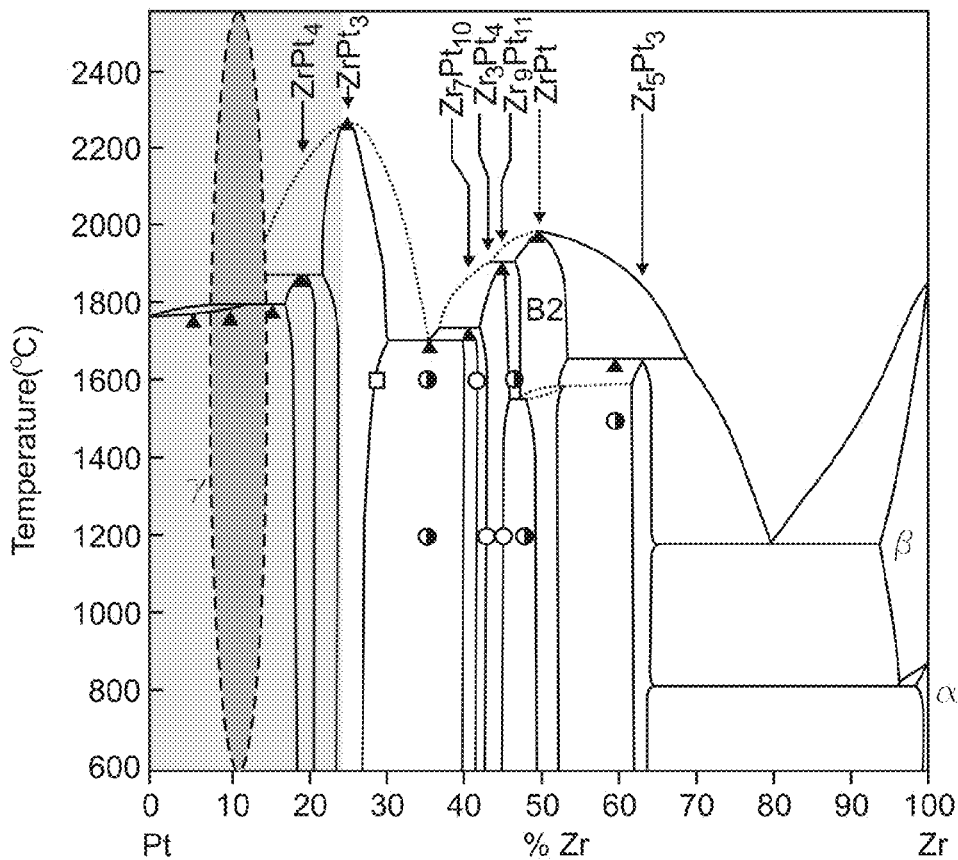
FIG. 11a is a graph showing the binary phase diagram for the Pt—Zr alloy series, at which various $Pt_{100-x}Zr_x$ compositions occur, wherein the ellipse shows compositions with high electrochemical performance.
Figure 11B:
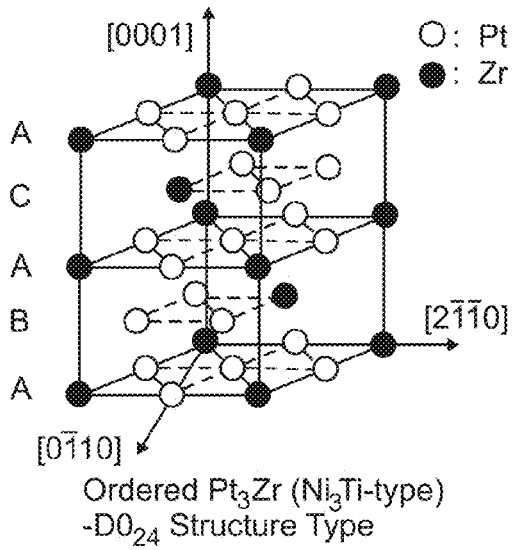
FIG. 11b is a schematic showing the $D0_{24}$ crystal structure for the $Pt_3Zr$ composition.

FIG. 11a is a graph showing the binary phase diagram for the Pt—Zr alloy series, at which various $Pt_{100-x}Zr_x$ compositions occur, wherein the ellipse shows compositions with high electrochemical performance, and FIG. 11b is a schematic showing the $D0_{24}$ crystal structure for the $Pt_3Zr$ composition.

Process Steps

Figure 12:
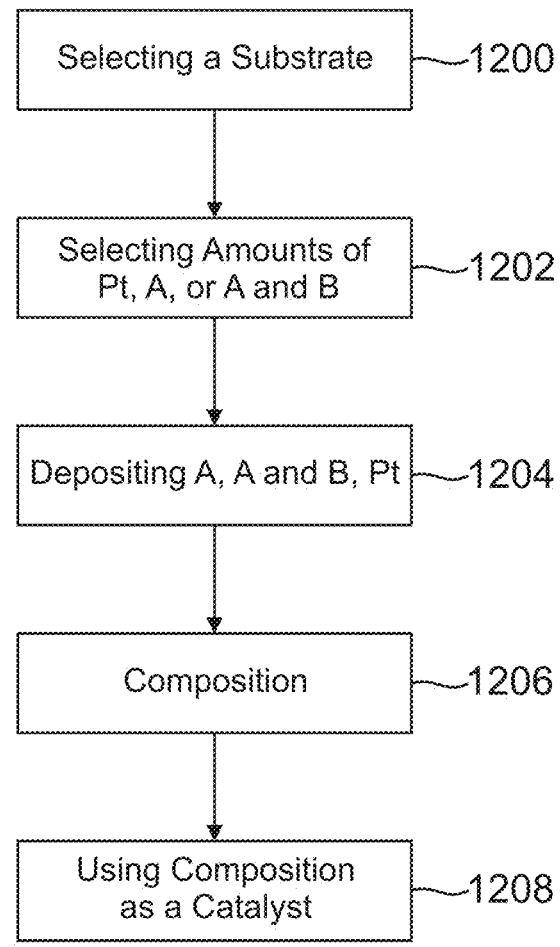
FIG. 12 is a flowchart illustrating a method of fabricating and using a Pt metal alloy composition as a catalyst.

FIG. 12 illustrates a method of fabricating a platinum (Pt) metal containing alloy composition useful as a catalyst electrode.

Block 1200 represents selecting a substrate. The step may comprise selecting a crystalline structure and grain size of the substrate. The substrate may be crystalline or nanocrystalline. The substrate may be a nanoparticle support. The substrate may be a hollow spherical nanoparticle (e.g., nanoshell) support, with typical diameter of 100 nm or larger. The substrate may be a micron-sized metallic or non-metallic support (e.g.–325 mesh). The substrate may be a porous support having open areas. The substrate may be a wire or wire-gauze support. The substrate may include a metal (e.g., Ti, Au) and a current collector structure and the metal's grain size is on a nanoscale (e.g., 100 nanometers or less).

Block 1202 represents selecting early transition metal A, A and B, or A, B and PGM. The amount of A or A and B and Pt may be such that the film has a microstructure ranging between an amorphous and a nanocrystalline microstructure. A may be at least one valve metal element of Zirconium (Zr), Titanium (Ti), Hafnium (Hf), and Niobium (Nb), for example. The step may comprise selecting the amounts of early transition metal, valve metal A, and Pt such that the film has a microstructure ranging between an amorphous or nanocrystalline microstructure, or with a mixture of both phases.

Block 1204 represents depositing Pt and the at least one early transition metal element A, or A and B onto the substrate.

A nanoparticle wash may be applied to the open areas of the porous support, wherein the nanoparticle wash includes a compound of Pt and at least one early transition metal element A, from group IVB or VB of the Periodic table. The nanoparticle wash may be heat-treated or fired to promote adherence to the surface of the porous support.

The alloy may be prepared by sputtering onto a support (or substrate). The sputtering may be from single alloyed target onto a support (or substrate). The sputtering may be co-sputtering from multiple targets onto a support (or substrate). The alloy may be deposited onto a support of any type, geometry, or size by hollow core magnetron sputtering.

The alloy may be prepared by electron beam evaporation from multiple targets onto a support (or substrate).

The alloy may be prepared by electron beam evaporation from a single alloyed target onto a support (or substrate).

Discreet nanoparticle forms of the alloy may be prepared by vapor-phase condensation in a high-vacuum chamber.

The alloy may be deposited onto a support by Atomic-Layer-Deposition (ALD) processing.

The alloy may be prepared by mechanical alloying (ball milling).

The alloy may be prepared by gas-atomization processing to yield an alloy in powder form.

The alloy may be prepared by centrifugal atomization processing to yield an alloy in powder form.

The alloy may be prepared by rapid solidification rate processing to yield an alloy with a nanostructured or amorphous atomic arrangement or microstructure. For example, the alloy may be prepared by the melt-spinning process to yield a thin-foil geometry product, wherein the alloy has a nanostructured or amorphous atomic arrangement or microstructure. The alloy may be prepared by the melt-extraction process to yield a wire-geometry product, wherein the alloy has a nanostructured or amorphous atomic arrangement or microstructure.

The alloy may be prepared by wet chemistry techniques resulting in the formation of small particles or nanoparticles. For example, the alloy may be prepared by the co-precipitation wet chemistry technique resulting in the formation of nanoparticles. The alloy may be prepared by the colloidal synthesis wet chemistry technique resulting in the formation of nanoparticles. The alloy may be prepared by the any wet chemistry technique involving PARR bomb processing at high temperatures resulting in the formation of nanoparticles.

The step may further comprise depositing the Pt, A and at least one late transition metal B on the substrate, wherein A includes at least one of Zirconium (Zr), Titanium (Ti), Hafnium (Hf), and Niobium (Nb), and B includes at least one of Cobalt (Co), Nickel (Ni), and Iron (Fe), and with at least one PGM element of Palladium (Pd), Ruthenium (Ru), Rhodium (Rh), Rhenium (Re), Osmium (Os), and Iridium (Ir), for example. Alternatively, A may include at least one of Zirconium (Zr), Titanium (Ti), Hafnium (Hf), and Niobium (Nb), and B may include at least one of Cobalt (Co), Nickel (Ni), and Iron (Fe), for example.

The step may further comprise depositing the Pt, A, B, and at least one platinum group metal (PGM), wherein the PGM element includes at least one of Palladium (Pd), Ruthenium (Ru), Rhodium (Rh), Rhenium (Re), Osmium (Os), and Iridium (Ir).

Block 1206 represents the composition fabricated using the method, a platinum (Pt) metal containing alloy composition for use as a catalyst (e.g., electrode). The Pt metal containing alloy composition may comprise a film (e.g. continuous) including a compound of Pt and at least one early transition metal element A from group IVB or VB of the Periodic table. The Pt metal containing alloy composition may comprise a nanoparticle; e.g., with nominal particle size 10 nm or less, including a compound of Pt and at least one early transition metal element A from group IVB or VB of the Periodic table. The Pt metal containing alloy composition may comprise a metallic nanocrystalline cluster or quantum dot on a nanoparticle support, wherein the metallic nanocrystalline cluster or quantum dot includes a compound of Pt and at least one early transition metal element A from group IVB or VB of the Periodic table. The composition may comprise less than 50% At. % Pt in the compound.

A may comprise at least one valve metal element of Zirconium (Zr), Titanium (Ti), Hafnium (Hf), and Niobium (Nb).

The Pt-containing compound further comprises at least one late transition metal B, thereby forming a Pt—B-A alloy.

A may include at least one of Zirconium (Zr), Titanium (Ti), Hafnium (Hf), and Niobium (Nb), and B includes at least one of Cobalt (Co), Nickel (Ni), and Iron (Fe).

The Pt-containing compound may further comprise at least one platinum group metal (PGM), thereby forming a Pt-PGM-B-A alloy, wherein the PGM element includes at least one of Palladium (Pd), Ruthenium (Ru), Rhodium (Rh), Rhenium (Re), Osmium (Os), and Iridium (Ir).

A may include at least one of Zirconium (Zr), Titanium (Ti), Hafnium (Hf), and Niobium (Nb), and B includes at least one of Cobalt (Co), Nickel (Ni), and Iron (Fe), and with at least one PGM element of Palladium (Pd), Ruthenium (Ru), Rhodium (Rh), Rhenium (Re), Osmium (Os), and Iridium (Ir).

A may include at least one of Zirconium (Zr), Titanium (Ti), Hafnium (Hf), and Niobium (Nb), and B includes at least one of Cobalt (Co), Nickel (Ni), and Iron (Fe), and with at least one PGM element of Palladium (Pd), Ruthenium (Ru), Rhodium (Rh), Rhenium (Re), Osmium (Os), and Iridium (Ir).

Examples of embodiments of the alloy composition include $Pt_{66}Co_{24}Zr_{10}$ (Atomic %), $Pt_{68}Co_{23}Zr_9$ (Atomic %), $Pt_{53}Co_{20}Zr_{27}$ (Atomic %), $Pt_{92}Zr_8$ (Atomic %) and $Pt_{67}Zr_{33}$ (Atomic %).

The film may be a continuous film on a nanoparticle support, on a hollow spherical nanoparticle support, or on a micron-sized metallic or non-metallic support, or on a wire or wire-gauze support, for example.

The Pt-containing compound may further comprise at least one late transition metal B, thereby forming a Pt—B-A alloy. For example, the Pt-containing alloy composition may be $(Pt_3Co)_{100-y}Zr_y$ with $0 \leq y \leq 30$ (At. %) or $(Pt_{100-x}Co_x)_{100-y}Zr_y$ with $0 \leq x \leq 80$ and $0.5 \leq y \leq 60$.

The Pt-containing compound may further comprise at least one platinum group metal (PGM), thereby forming a Pt-PGM-B-A alloy, wherein the PGM element includes at least one of Palladium (Pd), Ruthenium (Ru), Rhodium (Rh), Rhenium (Re), Osmium (Os), and Iridium (Ir).

The film may be crystalline with a grain size such that, when the film is used as the cathode catalyst, an active area of the cathode is above 218 μf/cm$^2$ (see also FIG. 4a, FIG. 6, and Table 1, for example). The film may be sputtered on the substrate. The alloy composition may be crystalline (e.g., with a (111) crystallographic orientation), nanocrystalline with a grain size of no more than 100 nm, nanocrystalline with a preferred grain size of less than 10 nm.

Block 1208 represents using the composition formed in Block 1206 as a catalyst.

The alloy may be used as a catalyst in a catalytic convertor for a internal combustion engine burning gasoline or diesel fuel.

The alloy may be used as a replacement catalyst for Pt catalysts used in the Platforming process, which enables the synthesis of gasoline without the addition of lead to the gasoline.

The alloy may be used as the anode in a hydrogen-air fuel cell or hydrogen-oxygen fuel cell.

The alloy may be used as the cathode in a hydrogen-air fuel cell, hydrogen-oxygen fuel cell, or direct methanol fuel cell (DMFC). In this application, the amount of A and an amount of Pt in the alloy may be such that that the alloy may be at least 2 times more electrochemically active, than Pt, as the cathode material for the oxygen reduction reaction (ORR).

The alloy may be used as the anode in a direct methanol fuel cell (DMFC).

In one embodiment, the alloy composition is $Pt_{66}Co_{24}Zr_{10}$ (Atomic %), and may be used as the cathode in a hydrogen-air fuel cell. In this embodiment, the alloy as a cathode may be at least 31 times more electrochemically active at 0.9 V (vs. NHE) than Pt, when used as the cathode material for the oxygen reduction reaction (ORR).

In one embodiment, the alloy composition is $Pt_{68}Co_{23}Zr_9$ (Atomic %), and may be used as the cathode in a hydrogen-air fuel cell. In this embodiment, the alloy as a cathode may be at least 30 times more electrochemically active at 0.9 V (vs. NHE) than Pt, when used as the cathode material for the oxygen reduction reaction (ORR).

In another embodiment, the alloy composition is $Pt_{53}Co_{20}Zr_{27}$ (Atomic %), and may be used as the cathode in a hydrogen-air fuel cell. In this example, the alloy cathode may be at least 16 times more electrochemically active at 0.9 V (vs. NHE) than Pt, when used as the cathode material for the oxygen reduction reaction (ORR).

In another embodiment, the alloy composition is $Pt_{92}Zr_8$ (Atomic %), and may be used as the cathode in a hydrogen-air fuel cell. In this example, the alloy as a cathode is at least 5 times more electrochemically active at 0.9 V (vs. NHE) than Pt, when used as the cathode material for the oxygen reduction reaction (ORR).

In another embodiment, the alloy composition is $Pt_{67}Zr_{33}$ (Atomic %), and may be used as the cathode in a hydrogen-air fuel cell. In this example, the alloy cathode may be at least 2 times more electrochemically active at 0.9 V (vs. NHE) than Pt, when used as the cathode material for the oxygen reduction reaction (ORR).

An amount of A and the amount of Pt in the film may be such that the film is electrochemically stable, with no decrease in electrochemical activity of the cathode, when the electrochemical activity is characterized by conducting multiple cycles of a cyclic voltammogram (CV) over the potential range 0.0 to at least 1.2 Volts (vs. NHE) to determine the durability of said alloy: measuring a current flowing between the film and an anode, in a electrochemical ½-cell, in response to a voltage applied to the film that is ramped from 0.0 to at least 1.2 Volts at a scan rate of at least 10 mV/second, wherein the voltage is ramped from the 0.0 Volts to the at least 1.2 Volts at least 1000 times (over 1000 cycles); and the current not varying by more than the measurement accuracy (+/−10 microamps).

When the alloy is used as the cathode or anode in a hydrogen-air fuel cell, hydrogen-oxygen fuel cell, or direct methanol fuel cell (DMFC), the electrolyte may comprise an acid electrolyte, the acid electrolyte may comprise a mixture perchloric acid in water ($HClO_4/H_2O$) (e.g., a 1 molar perchloric acid concentration in water ($HClO_4/H_2O$)), the acid electrolyte may comprise a mixture of sulfuric acid in water ($H_2SO_4/H_2O$) (e.g., a 1 molar sulfuric acid concentration in water ($H_2SO_4/H_2O$)). The acid electrolyte may saturate a polymer exchange membrane electrolyte (e.g. Nafion).

The film may be crystalline with a grain size such that, when the film is used as the cathode catalyst in a hydrogen-air or hydrogen-oxygen fuel cell, and the measured Pt-active area from the hydrogen-oxidation-reaction (HOR) of the cathode is greater than that of polycrystalline Pt, $A_{Pt}=210$ $\mu C/cm^2$.

Further Results

Figure 13:
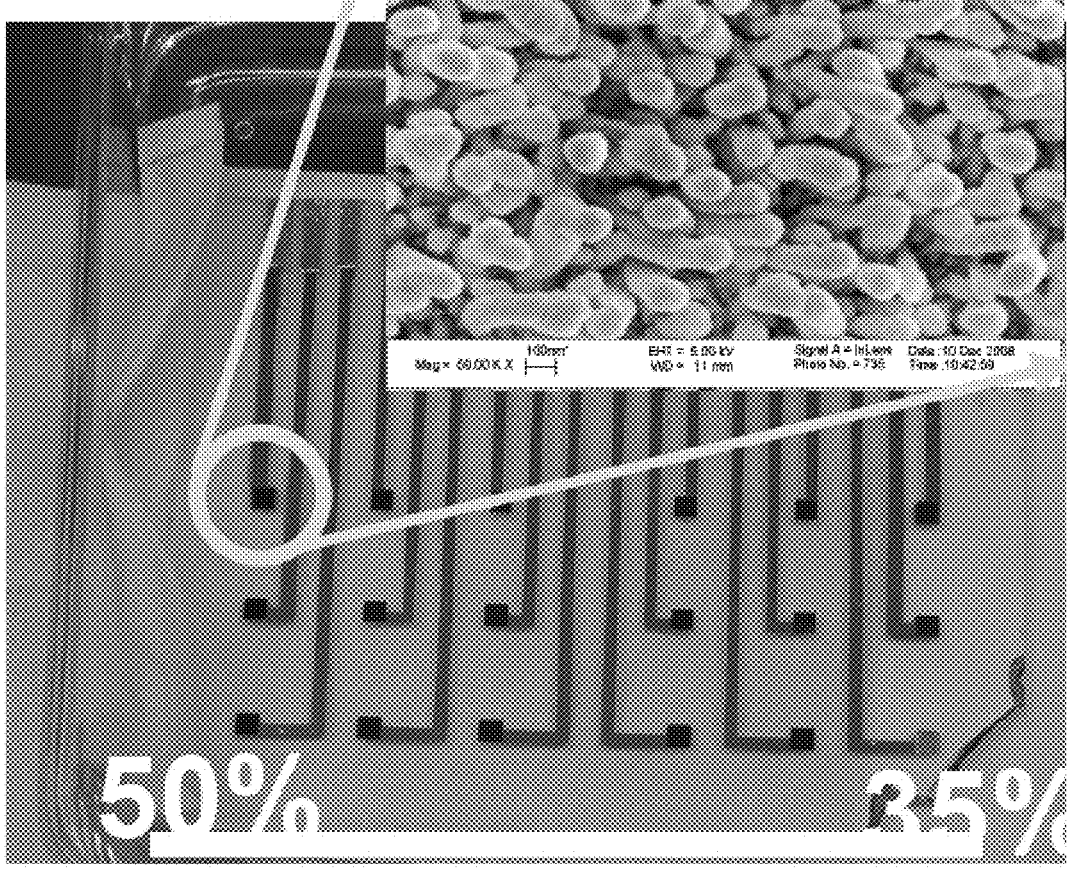
FIG. 13 is an image of a multi electrode NSTF Array, wherein the scale bar shows 50% to 35% (At %) Pt-content.

FIG. 13 is an image of a multi electrode NSTF Array, wherein the scale bar shows Pt-content in the Array of 50% to 35%.

Figure 14:
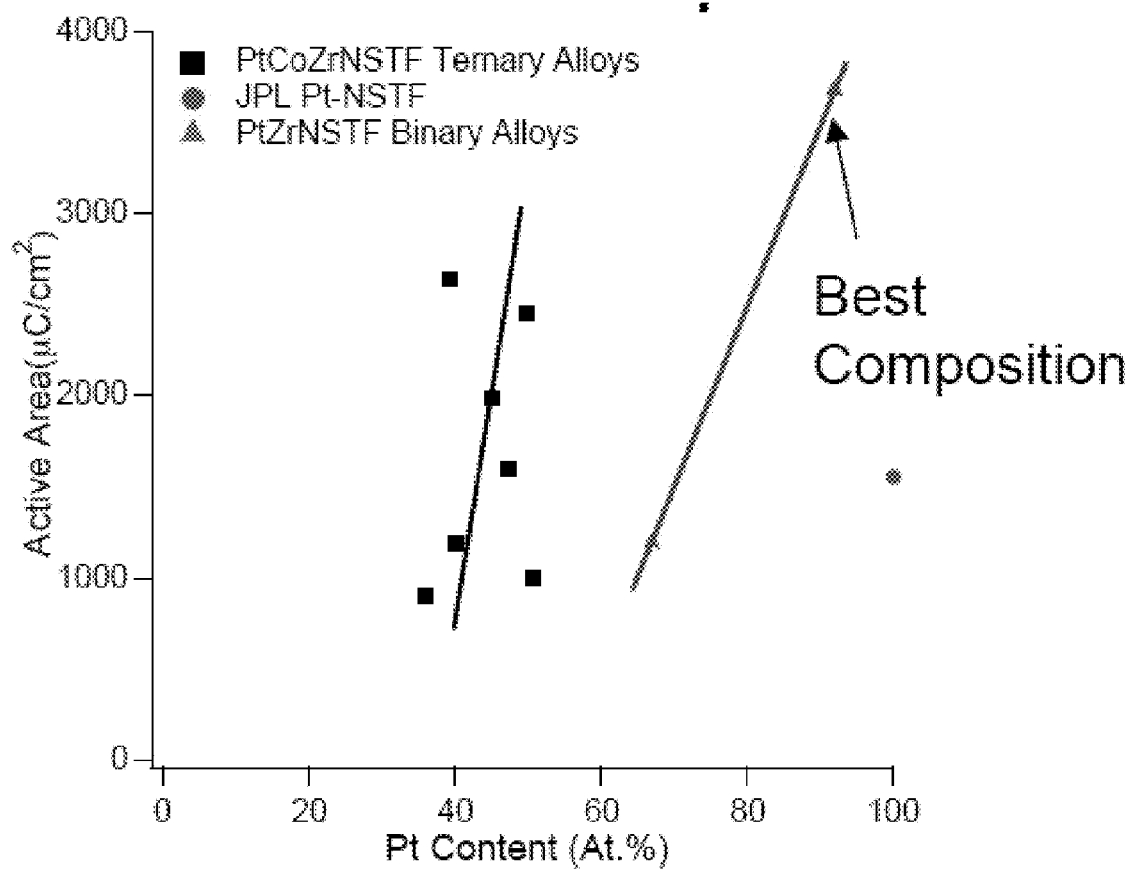
FIG. 14 shows active area ($\mu C/cm^2$) as a function of Pt content (At %), for PtCoZr, PtZr and Pt.

FIG. 14 shows active area ($\mu C/cm^2$) as a function of Pt content (At %), for PtCoZr, PtZr, and Pt.

Figure 15:
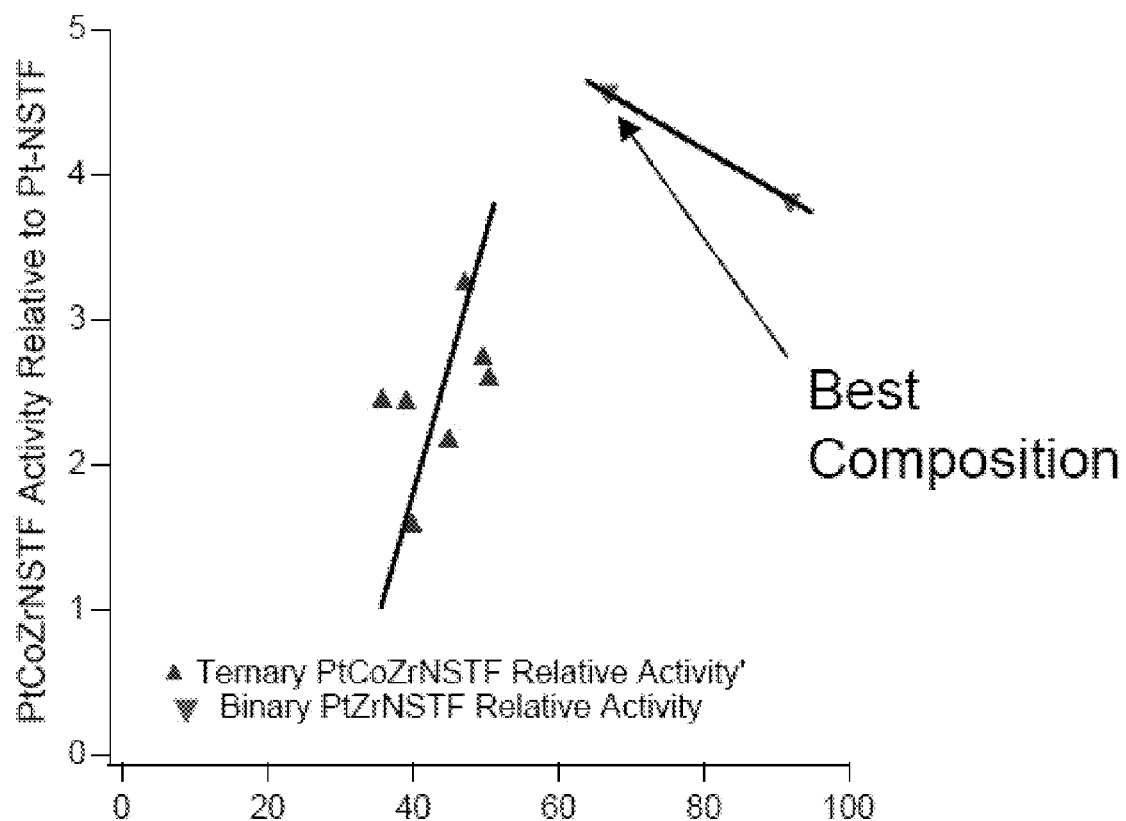
FIG. 15 shows activity relative to Pt for ORR, for PtCoZr and PtZr as a function of Pt content (At %).

FIG. 15 shows activity for ORR for PtCoZr and PtZr as a function of Pt content (At %).

TABLE 2

Composition Range on Electrode Array

| | | | |
|---|---|---|---|
| E-11 | E-12 | E-13 | E-14 |
| $Pt_{49.9}Co_{37.4}Zr_{12.7}$ | $Pt_{47.3}Co_{35}Zr_{17.7}$ | $Pt_{40}Co_{35}Zr_{25}$ | $Pt_{33.8}Co_{32.7}Zr_{33.5}$ |
| E-15 | E-16 | E-21 | E-22 |
| $Pt_{32.5}Co_{28.6}Zr_{38.9}$ | $Pt_{35.8}Co_{30}Zr_{34.2}$ | $Pt_{52.1}Co_{36.5}Zr_{11.4}$ | $Pt_{45.1}Co_{36.9}Zr_{18}$ |
| E-23 | E-24 | E-25 | E-26 |
| $Pt_{39}Co_{35.3}Zr_{25.7}$ | $Pt_{33.4}Co_{33.6}Zr_{34}$ | $Pt_{32}Co_{30.1}Zr_{37.9}$ | $Pt_{37.5}Co_{29.2}Zr_{33.3}$ |
| E-31 | E-32 | E-33 | E-34 |
| $Pt_{50.5}Co_{33.2}Zr_{16.3}$ | $Pt_{44.7}Co_{35}Zr_{20.3}$ | $Pt_{39.2}Co_{36.6}Zr_{24.2}$ | $Pt_{33.4}Co_{32.8}Zr_{33.8}$ |
| E-35 | E-36 | | |
| $Pt_{35.1}Co_{28.5}Zr_{36.4}$ | No whiskers | | |

Possible Modifications

The compositions of the present invention may be fabricated by methods other than co-sputtering, including for example, e-beam deposition.

The compositions of the present invention may be used for various applications where catalytic properties are useful. For example:

1. The present invention may be used to replace Pt gauze in a nitrogen fertilizer application.

2. The present invention may be used in a catalytic converter.

3. The present invention may be used in a hydrogen fuel cell or an hydrogen and air fuel cell, or in a fuel cell that uses a PEM membrane electrode. The present invention may be used as an anode and/or a cathode.

4. The present invention could be used in a nanofuel cell, wherein the nanofuel cell is surrounded by microcatalytic compositions of the present invention.

5. Various crystal forms of the present invention, as well as various compositions, may be tailored for particular applications.

Advantages and Improvements

Technical issues in the current state of the art, coupled with the high-cost and limited availability of Pt metal, have motivated the present invention to search for new Pt-based, transition metal alloy catalysts that are stable in acid and electrochemically active for the oxygen reduction reaction (ORR).

The scientific methodology of the present invention has employed the following key concepts in materials design, chemical physics, and electrochemistry, to achieve improvements associated with the following metrics for fuel cell cathode materials:

1) controlled alloy design methods used to obtain improved corrosion resistance and increased stability in acid solutions;

2) thin film synthesis (co-sputtering unique) used to obtain a wide range of multi-component Pt-based, binary- and ternary-alloys, thin film form;

3) thin film synthesis, coupled with modulations of chemical composition, enables control of the microstructural length scale of the materials prepared (amorphous to nanocrystalline microstructures);

4) d-band engineering (i.e., filling of the transition metal d-band) used to control the relative position of the Fermi energy, $\epsilon_f$, and the density of states at the Fermi energy, $\mathscr{D}(\epsilon_f)$, thereby enabling controlled reductions in the ORR activation potential (i.e., reduced over-potential $V_{over}$ results in increased ORR current density);

5) control of the microstructural length scales can be used to exploit the occurrence of quantum size effects in small- or nanocrystalline-particles; which can result in controllable shifts in the relative position of the Fermi energy, $\epsilon_f$, thereby enabling another means to obtain reductions in the ORR activation potential.

The results of the present invention suggest that in order to endow an enhanced corrosion resistance to Pt-based alloys, while maintaining a high catalytic activity, addition of group IVB, VB valve metal elements appears to be of value. The present invention is also able to achieve at least 2-10 times electrochemical (ORR and Hydrogen oxidation) performance as compared to a pure Pt electrode. The present invention also shows that reducing the amount of Pt in the alloy electrode may increase the electrochemical performance of the Pt alloy electrode, as shown in FIGS. 6-9.

REFERENCES

The following references are incorporated by reference herein.

[1] J. F. Whitacre, T. I. Valdez, and S. R. Narayanan, "A high-throughput study of PtNiZr catalysts for application in PEM fuel cells," Electrochemica Acta 53, 3680 (2008).

[2] "Advanced Cathode Catalysts and Supports for PEM Fuel Cells," fuel cell presentation on catalysts by Mark Debe at the 2009 Annual Merit Review Proceedings for the U.S. Department of Energy Hydrogen Program, http://www.hydrogen.energy.gov/pdfs/review09/fc_17_debe.pdf.

[3] Kathi Epping Martin, John P. Kopasz, and Kevin W. McMurphy, "Fuel Cell

Chemistry and Operation", Chapter 1, pp 1-13, ACS Symposium Series, Vol. 1040, 2010 American Chemical Society.

[4] V. R. Stamenkovic et al, Nature Materials 6, 241 (2007).

[5] J. K. Stalick, R. M. Waterstrat, J. Alloys and Compounds 430, 2123 (2007).

[6] Quantum Sphere Corporation, http://www.qsinano.com/tech_process.php, (2010).

[7] S. M. George, Chemical Vapor Deposition, Vol. 11, page 420 (2005).

[8] G. Haour and H. Bode, page 111 of Rapid Solidification Technology Source Book, American Society for Metals (1983), Metals Park, Ohio, R. L. Ashbrook (Editor).

[9] R. E. Marienger, p. 121 of Rapid Solidification Technology Source Book, American Society for Metals (1983), Metals Park, Ohio, R. L. Ashbrook (Editor).

[10] B. H. Kear et. al., "On the Microstructure of rapidly solidified In-100 Powders," page 66 of Rapid Solidification Technology Source Book, American Society for Metals (1983), Metals Park, Ohio.

[11] Charles C. Hays PhD Thesis, "A Mott-Hubbard/Fermi-Liquid Systems $La_{1-x}Sr_xTiO_3$," University of Texas at Austin, Austin Tex. (1997).

[12] A. Biswas et. al., Applied Physics Letters, Vol. 88, 013103 (2006).

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A platinum (Pt) metal containing alloy composition useful as a catalyst, comprising:
    a film including a compound of Pt and at least one transition metal element A from group IVB or VB of the Periodic table, wherein:
    a structure of the compound is single phase,
    the compound comprises a Pt content of less than 50 Atomic percent (At. %),
    the compound exhibits a reversible electrochemical activity having a durability, and
    the reversible electrochemical activity and the durability are at least as high as the reversible electrochemical activity and durability, respectively, of a compound consisting essentially of Pt.

2. The composition of claim 1, wherein the Pt-containing compound further comprises at least one transition metal B, thereby forming a Pt-B-A alloy.

3. The composition of claim 2, wherein B comprises at least one element selected from the group consisting of Nickel, Cobalt, and Iron.

4. The composition of claim 3, wherein A comprises Vanadium.

5. The composition of claim 3, wherein A comprises Titanium.

6. The composition of claim 2, wherein the compound comprises the Pt content of 33 At. %.

7. The composition of claim 6, wherein B comprises Nickel and A comprises Vanadium.

8. The composition of claim 6, wherein A comprises Titanium and B comprises Nickel.

9. The composition of claim 2, wherein the Pt content is between 15 At. % and 40 At. %.

10. An electrochemical device comprising the composition of claim 9 as an anode, wherein:
    the Pt content is 37 At. %,
    the transition metal B is Nickel having a content of 43 At. %,
    the transition metal element A is Vanadium having a content of 20 At. %, and
    the compound has the formula $Pt_{37}Ni_{43}V_{20}$.

11. An electrochemical device comprising the composition of claim 9 as a cathode, wherein:
    the Pt content is 33 At. %,
    the transition metal B is Nickel having a content of 44 At. %,
    the transition metal A is Vanadium having a content of 23% At. %, and
    the compound has the formula $Pt_{33}Ni_{44}V_{23}$.

12. The composition of claim 2, wherein the compound has the formula $(Pt_{100-x}B_x)_{100-y}A_y$ with $0 \leq x \leq 80$ and $0.5 \leq y \leq 60$.

13. The composition of claim 1, wherein the compound comprises the Pt content of 37.5 or less At. %.

14. The composition of claim 1, wherein the Pt-containing compound further comprises:
    at least one transition metal B; and
    at least one platinum group metal (PGM), thereby forming a Pt-PGM-B-A alloy, wherein the PGM element includes at least one of Palladium (Pd), Ruthenium (Ru), Rhodium (Rh), Rhenium (Re), Osmium (Os), and Iridium (Ir).

15. The composition of claim 1, wherein the compound comprises the Pt content of at least 19.9 At. %.

16. The composition of claim 15, wherein the Pt-containing compound further comprises at least one transition metal B.

17. The composition of claim 16, wherein A comprises Vanadium and B comprises Nickel.

18. The composition of claim 16, wherein A comprises Titanium and B comprises Nickel.

19. The composition of claim 1, wherein the transition metal A has a content between 0.5 At. % and 60% At. %.

20. The composition of claim 19, wherein A is Vanadium and B is Nickel.

21. The composition of claim 19, wherein A is Titanium and B is Nickel.

22. The composition of claim 1, wherein the film is on a carbon support.

23. An electrochemical cell comprising the compound of claim 1 as an anode, wherein the compound further comprises at least one transition metal B selected from the group consisting of Nickel, Cobalt, and Iron, thus forming a Pt-B-A alloy exhibiting a reversible hydrogen oxidation reaction with an activity at least as high as an anode consisting essentially of Pt.

24. The electrochemical cell of claim 23, wherein the transition metal element A is Vanadium or Titanium and the transition metal B is Nickel.

25. An electrochemical cell comprising the compound of claim 1 as an anode, wherein the compound further comprises at least one transition metal B selected from the group consisting of Nickel, Cobalt, and Iron, thus forming a Pt-B-A alloy exhibiting a reversible methanol oxidation reaction with an activity at least as high as an anode consisting essentially of Pt or Pt-Ruthenium.

* * * * *